United States Patent
Lam et al.

(10) Patent No.: US 12,308,222 B2
(45) Date of Patent: May 20, 2025

(54) SUBSPACE APPROACH TO ACCELERATE FOURIER TRANSFORM MASS SPECTROMETRY IMAGING

(71) Applicant: The Board of Trustees of the University of Illinois, Urbana, IL (US)

(72) Inventors: Fan Lam, Champaign, IL (US); Jonathan V. Sweedler, Urbana, IL (US); Yuxuan Xie, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 445 days.

(21) Appl. No.: 17/705,979

(22) Filed: Mar. 28, 2022

(65) Prior Publication Data
US 2022/0310374 A1    Sep. 29, 2022

Related U.S. Application Data

(60) Provisional application No. 63/167,370, filed on Mar. 29, 2021.

(51) Int. Cl.
*H01J 49/00* (2006.01)
*G06T 5/10* (2006.01)
*G06T 5/50* (2006.01)

(52) U.S. Cl.
CPC ............ *H01J 49/0036* (2013.01); *G06T 5/10* (2013.01); *G06T 5/50* (2013.01); *G06T 2207/20056* (2013.01); *G06T 2207/20212* (2013.01)

(58) Field of Classification Search
CPC .......... G06T 5/10; G06T 5/50; G01R 33/5608
See application file for complete search history.

(56) References Cited

U.S. PATENT DOCUMENTS

| | | | |
|---|---|---|---|
| 10,338,178 | B2 | 7/2019 | Liang et al. |
| 10,436,871 | B2 | 10/2019 | Li et al. |

(Continued)

OTHER PUBLICATIONS

Aichler, M.; Walch, A. MALDI Imaging Mass Spectrometry: Current Frontiers and Perspectives in Pathology Research and Practice. Lab. Investig. 2015, 95, 422-431.

(Continued)

*Primary Examiner* — Lam S Nguyen
(74) *Attorney, Agent, or Firm* — Crowell & Moring LLP

(57) ABSTRACT

Methods, apparatus, and storage medium for obtaining high-resolution mass spectra and chemical maps from a sample using a subspace Fourier transform mass spectrometry (FT-MS) approach are described. The method includes conducting a first set of image data corresponding to a first group of spatial positions on the sample and a second set of image data corresponding to a second group of spatial positions on the sample; conducting a decomposition process on the first set of image data to obtain a set of basis elements; performing a reconstruction process on a second set of image data to obtain a set of reconstructed image data; performing a Fourier transform on the first and second sets of image data to obtain a first and second sets of mass spectra, respectively; and obtaining a FT-MS image for the sample based on the first set of mass spectra and the second set of mass spectra.

20 Claims, 25 Drawing Sheets
(17 of 25 Drawing Sheet(s) Filed in Color)

(56) References Cited

U.S. PATENT DOCUMENTS

| | | | |
|---|---|---|---|
| 2009/0136104 A1* | 5/2009 | Hajian | G01R 33/56 |
| | | | 324/309 |
| 2013/0195327 A1* | 8/2013 | Tanji | G06T 5/70 |
| | | | 382/128 |
| 2016/0202336 A1 | 7/2016 | Liang et al. | |
| 2020/0049782 A1 | 2/2020 | Brender et al. | |

OTHER PUBLICATIONS

Alexandrov, T. MALDI Imaging Mass Spectrometry: Statistical Data Analysis and Current Computational Challenges. BMC Bioinformatics 2012, 13, S11.

Astigarraga, E.; Barreda-Gómez, G.; Lombardero, L.; Fresnedo, O.; Castaño, F.; Giralt, M. T.; Ochoa, B.; Rodriguez-Puertas, R.; Fernandez, J. A. Profiling and Imaging of Lipids on Brain and Liver Tissue by Matrix-Assisted Laser Desorption/Ionization Mass Spectrometry Using 2-Mercaptobenzothiazole as a Matrix. Anal. Chem. 2008, 80, 9105-9114.

Bartels, A.; Dulk, P.; Trede, D.; Alexandrov, T.; Maaß, P. Compressed Sensing in Imaging Mass Spectrometry. Inverse Probl. 2013, 29, 125015.

Bowman, A. P.; Blakney, G. T.; Hendrickson, C. L.; Ellis, S. R.; Heeren, R. M. A.; Smith, D. F. Ultra-High Mass Resolving Power, Mass Accuracy, and Dynamic Range MALDI Mass Spectrometry Imaging by 21-T FT-ICR MS. Anal. Chem. 2020, 92, 3133-3142.

Buchberger, A.; DeLaney, K.; Johnson, J.; Li, L. Mass Spectrometry Imaging: A Review of Emerging Advancements and Future Insights. Anal. Chem. 2018, 90, 240-265.

Chiron, Lionel, et al., "Efficient denoising algorithms for large experimental datasets and their applications in Fourier transform ion cyclotron resonance mass spectrometry," PNAS Jan. 28, 2014 111 (4) 1385-1390.

Chughtai, K.; Heeren, R. M. A. Mass Spectrometric Imaging for Biomedical Tissue Analysis. Chem. Rev. 2010, 110, 3237-3277.

Cornett, D. S.; Frappier, S. L.; Caprioli, R. M. MALDI-FTICR Imaging Mass Spectrometry of Drugs and Metabolites in Tissue. Anal. Chem. 2008, 80, 5648-5653.

Fonville, J. M.; Carter, C. L.; Pizarro, L.; Steven, R. T.; Palmer, A. D.; Griffiths, R. L.; Lalor, P. F.; Lindon, J. C.; Nicholson, J. K.; Holmes, E.; Bunch, J. Hyperspectral Visualization of Mass Spectrometry Imaging Data. Anal. Chem. 2013, 85, 1415-1423.

Gao et al., "Reconstruction and Feature Selection for Desorption Electrospray Ionization Mass Spectroscopy Imagery," Proc SPIE Int Soc Opt Eng. Mar. 12, 2014; vol. 9036: 90360D.

Gemperline, E.; Chen, B.; Li, L. Challenges and Recent Advances in Mass Spectrometric Imaging of Neurotransmitters. Bioanalysis 2014, 6, 525-540.

Gessel, M. M.; Norris, J. L.; Caprioli, R. M. MALDI Imaging Mass Spectrometry: Spatial Molecular Analysis to Enable a New Age of Discovery. J. Proteomics 2014, 107, 71-82.

Haldar, J. P.; Liang, Z.-P. Spatiotemporal Imaging with Partially Separable Functions: A Matrix Recovery Approach. In 2010 IEEE International Symposium on Biomedical Imaging: From Nano to Macro; 2010; pp. 716-719.

Halko, N.; Martinsson, P. G.; Tropp, J. A. Finding Structure with Randomness: Probabilistic Algorithms for Constructing Approximate Matrix Decompositions. SIAM Rev. 2011, 53, 217-288.

Hendrickson, C. L.; Quinn, J. P.; Kaiser, N. K.; Smith, D. F.; Blakney, G. T.; Chen, T.; Marshall, A. G.; Weisbrod, C. R.; Beu, S. C. 21 Tesla Fourier Transform Ion Cyclotron Resonance Mass Spectrometer: A National Resource for Ultrahigh Resolution Mass Analysis. J. Am. Soc. Mass Spectrom. 2015, 26, 1626-1632.

Kooijman, P. C.; Nagornov, K. O.; Kozhinov, A. N.; Kilgour, D. P. A.; Tsybin, Y. O.; Heeren, R. M. A.; Ellis, S. R. Increased Throughput and Ultra-High Mass Resolution in DESI FT-ICR MS Imaging through New-Generation External Data Acquisition System and Advanced Data Processing Approaches. Sci. Rep. 2019, 9, 1-11.

Kozhinov, A. N.; Tsybin, Y. O. Filter Diagonalization Method-Based Mass Spectrometry for Molecular and Macromolecular Structure Analysis. Anal. Chem. 2012, 84, 2850-2856.

Lam et al., "A Subspace Approach to High-Resolution Spectroscopic Imaging," Magnetic Resonance in Medicine 71:1349-1357 (2014).

Liang, Z. Spatiotemporal Imaging with Partially Separable Functions. In 2007 4th IEEE International Symposium on Biomedical Imaging: From Nano to Macro; 2007; pp. 988-991.

Nagornov, K. O.; Gorshkov, M. V.; Kozhinov, A. N.; Tsybin, Y. O. High-Resolution Fourier Transform Ion Cyclotron Resonance Mass Spectrometry with Increased Throughput for Biomolecular Analysis. Anal. Chem. 2014, 86, 9020-9028.

Neumann, E. K.; Comi, T. J.; Spegazzini, N.; Mitchell, J. W.; Rubakhin, S. S.; Gillette, M. U.; Bhargava, R.; Sweedler, J. V. Multimodal Chemical Analysis of the Brain by High Mass Resolution Mass Spectrometry and Infrared Spectroscopic Imaging. Anal. Chem. 2018, 90, 11572-11580.

Norris, J. L.; Caprioli, R. M. Imaging Mass Spectrometry: A New Tool for Pathology in a Molecular Age. Proteomics: Clin. Appl. 2013, 7, 733-738.

Palmer, A. D.; Bunch, J.; Styles, I. B. Randomized Approximation Methods for the Efficients Compression and Analysis of Hyperspectral Data. Anal. Chem. 2013, 85, 5078-5086.

Park, S.-G.; Anderson, G. A.; Bruce, J. E. Parallel Detection of Fundamental and Sixth Harmonic Signals Using an ICR Cell with Dipole and Sixth Harmonic Detectors. J. Am. Soc. Mass Spectrom. 2020, 31, 719-726.

Patterson, N. H.; Tuck, M.; Van de Plas, R.; Caprioli, R. M. Advanced Registration and Analysis of MALDI Imaging Mass Spectrometry Measurements through Autofluorescence Microscopy. Anal. Chem. 2018, 90, 12395-12403.

Qu, X.; Mayzel, M.; Cai, J.-F.; Chen, Z.; Orekhov, V. Accelerated NMR Spectroscopy with Low-Rank Reconstruction. Angew. Chem., Int. Ed. 2015, 54, 852-854.

Rubakhin, S. S.; Jurchen, J. C.; Monroe, E. B.; Sweedler, J. V. Imaging Mass Spectrometry: Fundamentals and Applications to Drug Discovery. Drug Discov. Today 2005, 10, 823-837.

Scigelova, M.; Hornshaw, M.; Giannakopulos, A.; Makarov, A. Fourier Transform Mass Spectrometry. Mol. Cell. Proteomics 2011, 10, M111.009431.

Ščupáková, K.; Balluff, B.; Tressler, C.; Adelaja, T.; Heeren, R. M. A.; Glunde, K.; Ertaylan, G. Cellular Resolution in Clinical MALDI Mass Spectrometry Imaging: The Latest Advancements and Current Challenges. Clin. Chem. Lab. Med. 2020, 58, 914-929.

Shariatgorji, M.; Nilsson, A.; Fridjonsdottir, E.; Vallianatou, T.; Källback, P.; Katan, L.; Savmarker, J.; Mantas, I.; Zhang, X.; Bezard, E.; Svenningsson, P.; Odell, L. R.; Andrén, P. E. Comprehensive Mapping of Neurotransmitter Networks by MALDI-MS Imaging. Nat. Methods 2019, 16, 1021-1028.

Shaw, J. B.; Lin, T.-Y.; Leach, F. E.; Tolmachev, A. V.; Tolić, N.; Robinson, E. W.; Koppenaal, D. W.; Paša-Tolić, L. 21 Tesla Fourier Transform Ion Cyclotron Resonance Mass Spectrometer Greatly Expands Mass Spectrometry Toolbox. J. Am. Soc. Mass Spectrom. 2016, 27, 1929-1936.

Smets, T.; Verbeeck, N.; Claesen, M.; Asperger, A.; Griffioen, G.; Tousseyn, T.; Waelput, W.; Waelkens, E.; De Moor, B. Evaluation of Distance Metrics and Spatial Autocorrelation in Uniform Manifold Approximation and Projection Applied to Mass Spectrometry Imaging Data. Anal. Chem. 2019, 91, 5706-5714.

Smith, D. F.; Kilgour, D. P. A.; Konijnenburg, M.; O'Connor, P. B.; Heeren, R. M. A. Absorption Mode FTICR Mass Spectrometry Imaging. Anal. Chem. 2013, 85, 11180-11184.

Soltwisch, J.; Kettling, H.; Vens-Cappell, S ; Wiegelmann, M.; Müthing, J.; Dreisewerd, K. Mass Spectrometry Imaging with Laser-Induced Postionization. Science 2015, 348, 211-215.

Tang, Fei, et al.,"Application of super-resolution reconstruction of sparse representation in mass spectrometry imaging," Rapid Communications in Mass Spectrometry 29.12 (2015): 1178-1184.

Van de Plas, R.; Yang, J.; Spraggins, J.; Caprioli, R. M. Image Fusion of Mass Spectrometry and Microscopy: A Multimodality Paradigm for Molecular Tissue Mapping. Nat. Methods 2015, 12, 366-372.

(56) References Cited

OTHER PUBLICATIONS

Vaysse, P.-M.; A. Heeren, R. M. A.; Porta, T.; Balluff, B. Mass Spectrometry Imaging for Clinical Research—Latest Developments, Applications, and Current Limitations. Analyst 2017, 142, 2690-2712.

Verbeeck, N.; Caprioli, R. M.; Van de Plas, R. Unsupervised Machine Learning for Exploratory Data Analysis in Imaging Mass Spectrometry. Mass Spectrom. Rev. 2020, 39, 245-291.

Vollnhals, F.; Audinot, J.-N.; Wirtz, T.; Mercier-Bonin, M.; Fourquaux, I.; Schroeppel, B.; Kraushaar, U.; Lev-Ram, V.; Ellisman, M. H.; Eswara, S. Correlative Microscopy Combining Secondary Ion Mass Spectrometry and Electron Microscopy: Comparison of Intensity-Hue-Saturation and Laplacian Pyramid Methods for Image Fusion. Anal. Chem. 2017, 89, 10702-10710.

Xian, F.; Hendrickson, C. L.; Marshall, A. G. High Resolution Mass Spectrometry. Anal. Chem. 2012, 84, 708-719.

Xie et al., "Accelerating Fourier Transform-Ion Cyclotron Resonance Mass Spectrometry Imaging Using a Subspace Approach," *J. Am. Soc. Mass Spectrom*. 2020, 31, 11, 2338-2347.

\* cited by examiner

300

```
conducting a data collection process that generates nonuniform lengths of FT-MS data across
different spatial locations on a sample, the FT-MS data comprising a first set of image data
corresponding to a first group of spatial positions on the sample and a second set of image data
corresponding to a second group of spatial positions on the sample      310
```

↓

```
conducting a decomposition process on the first set of image data to obtain a set of basis elements
for the sample
                                                                         320
```

↓

```
performing a reconstruction process on a second set of image data based on the set of basis
elements to obtain a set of reconstructed image data
                                                                         330
```

↓

```
performing a first Fourier transform on the first set of image data to obtain a first set of mass
spectra, the first set of mass spectra corresponding to the first group of spatial positions on the
sample                                                                   340
```

↓

```
performing a second Fourier transform on the set of reconstructed image data to obtain a second
set of mass spectra, the second set of mass spectra corresponding to the second group of spatial
positions on the sample                                                  350
```

↓

```
obtaining a FT-MS image for the sample based on the first set of mass spectra and the second set
of mass spectra
                                                                         360
```

FIG. 3

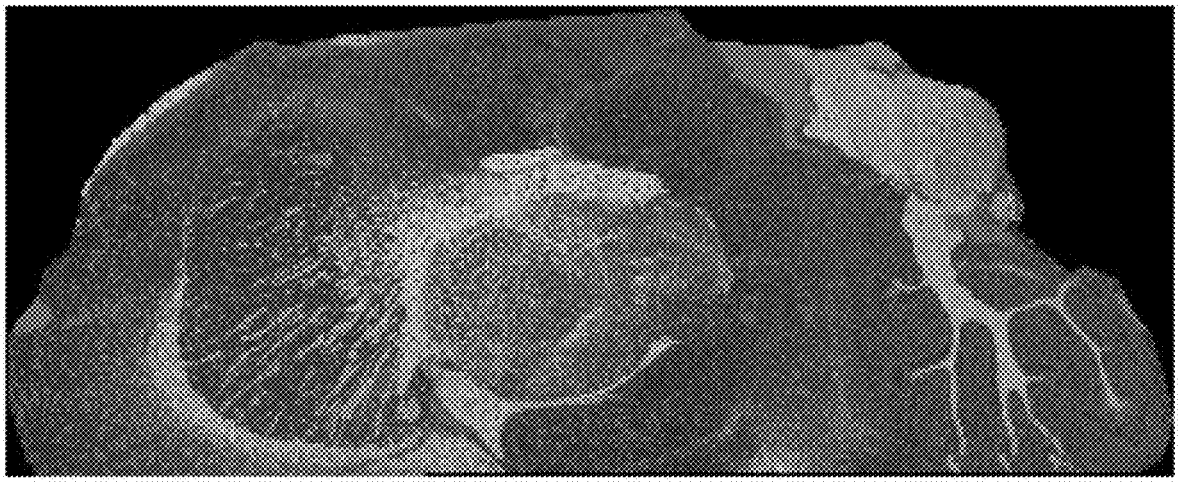
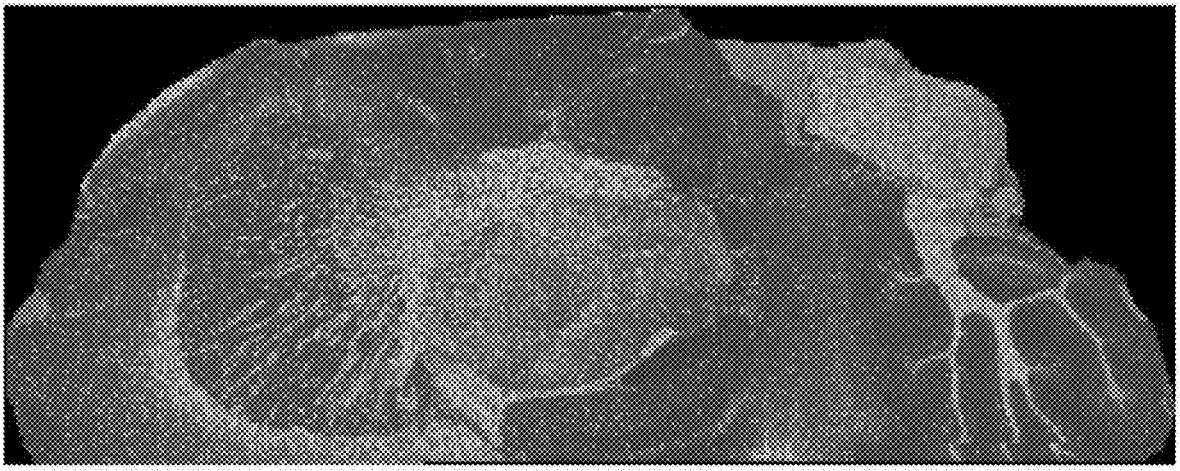
FIG. 9B

1310
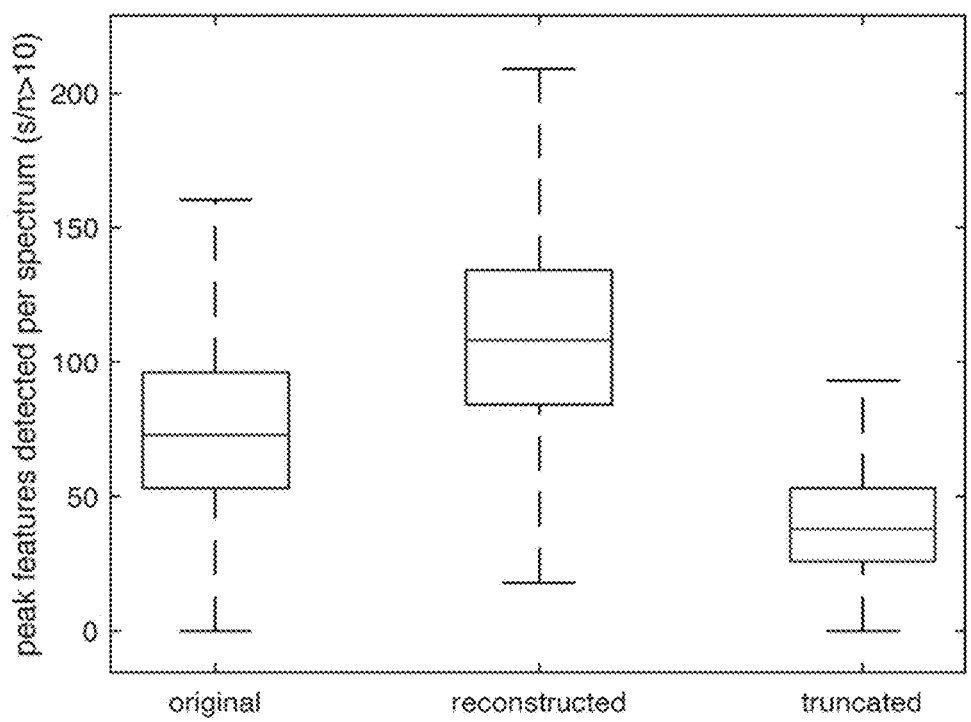
1320
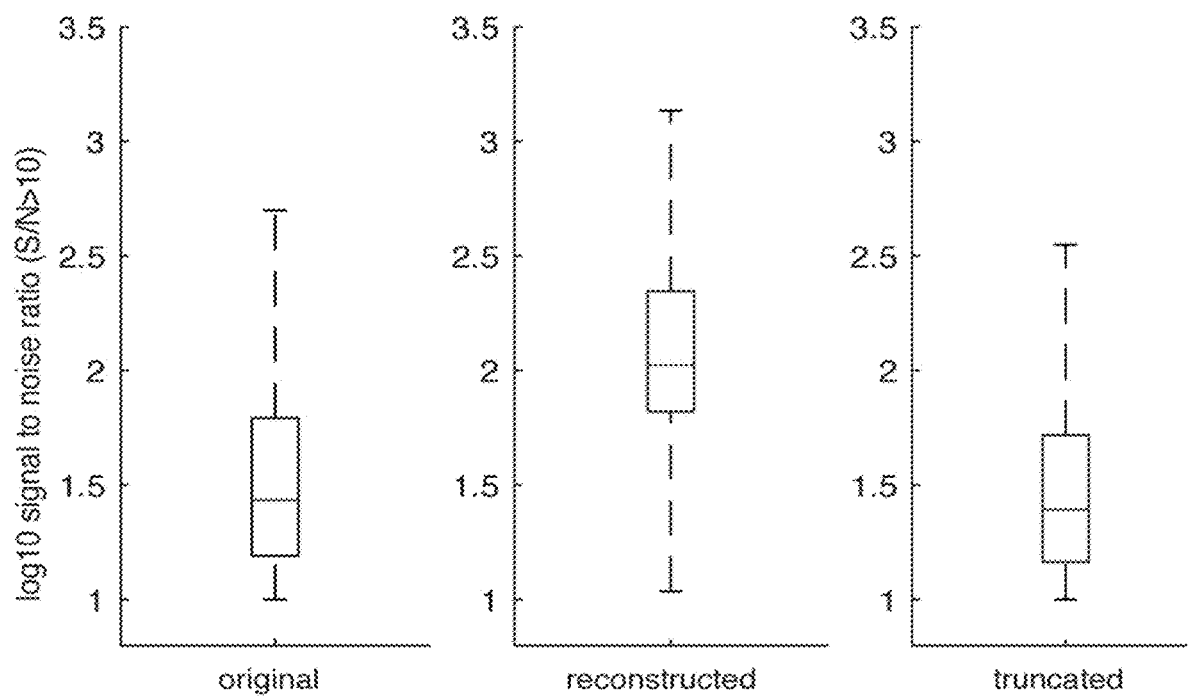
FIG. 13

1410
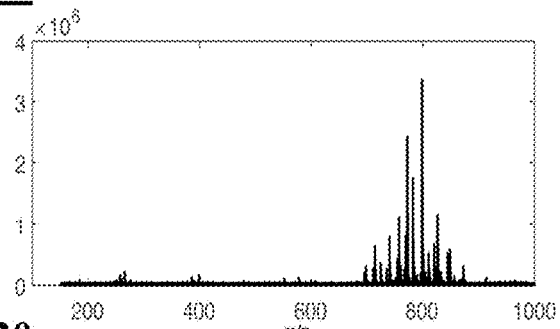
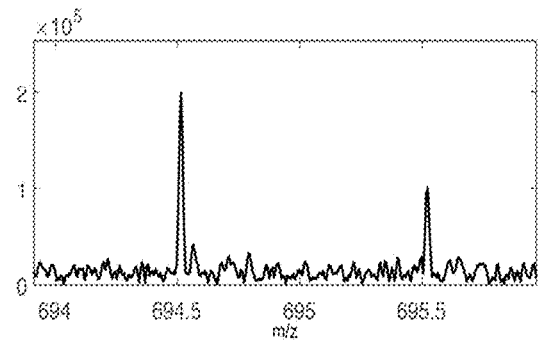
1420
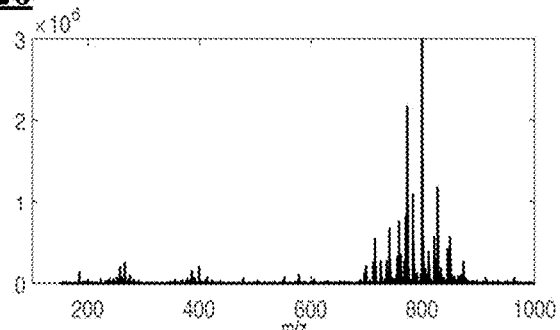
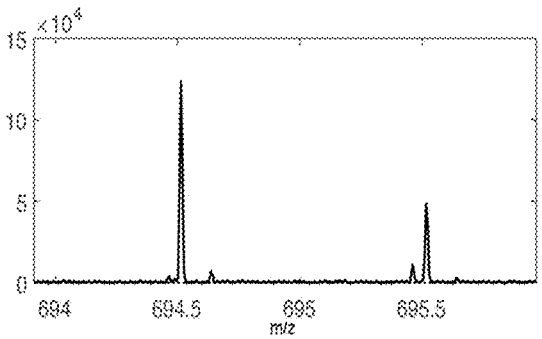
1430
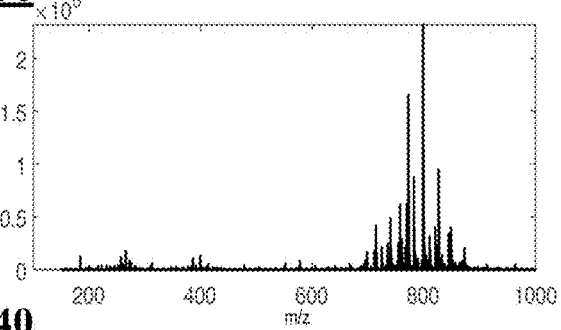
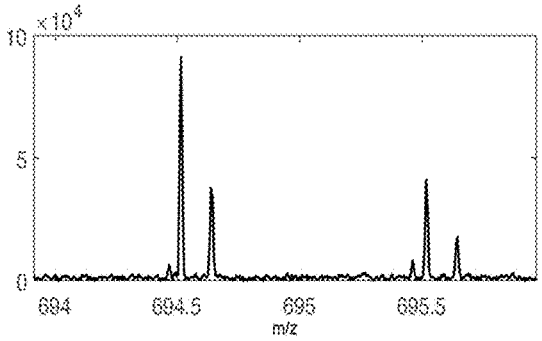
1440
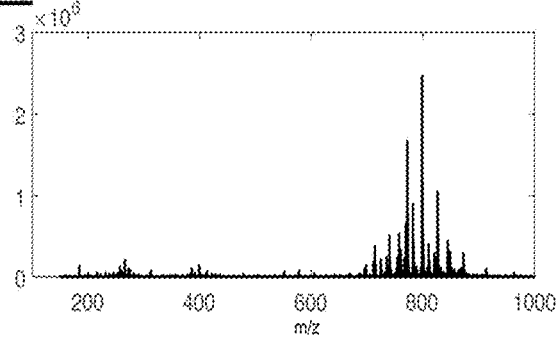
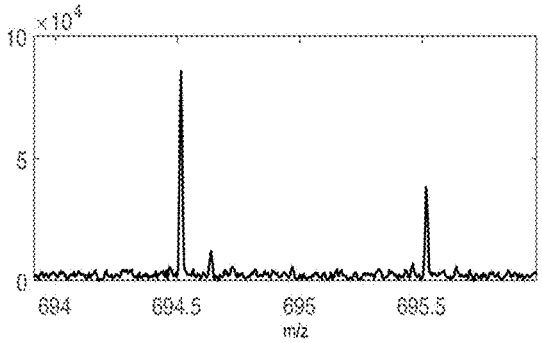
FIG. 14

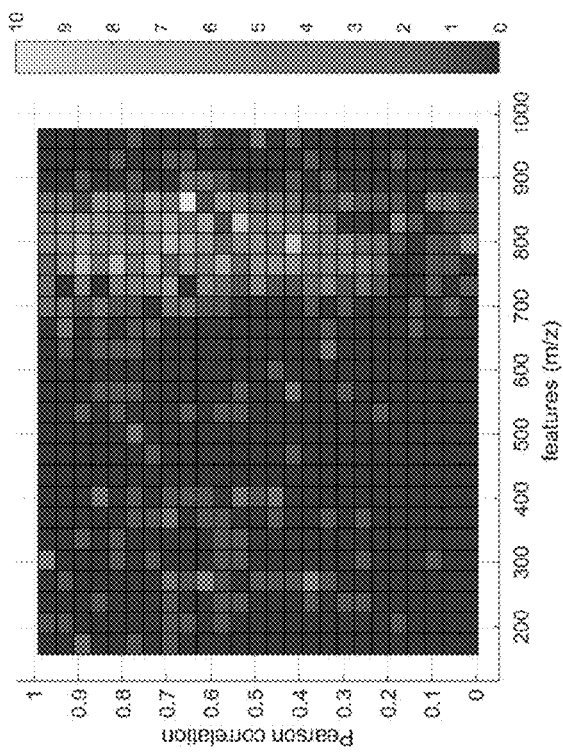
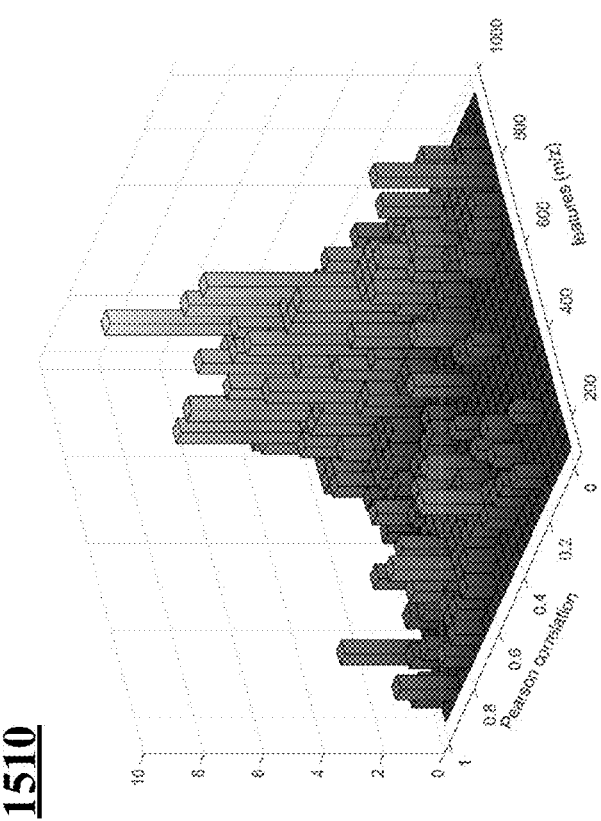
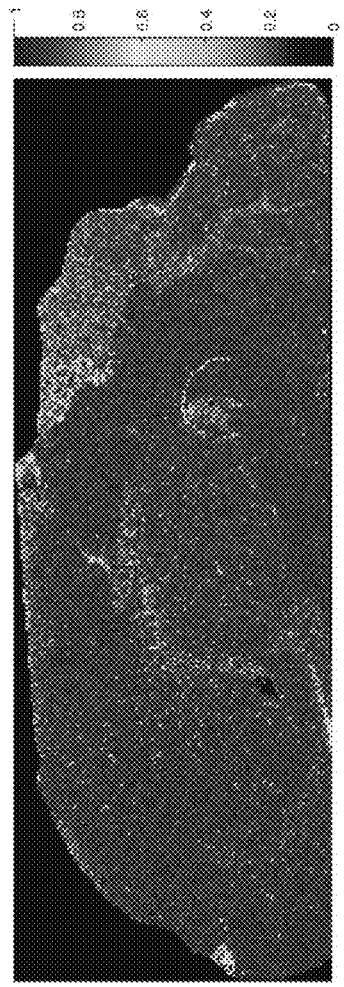
FIG. 15

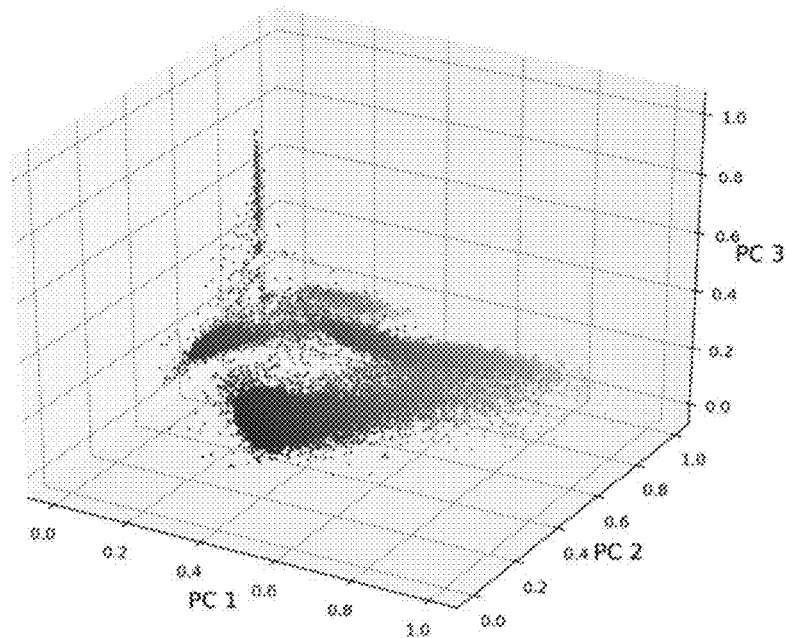
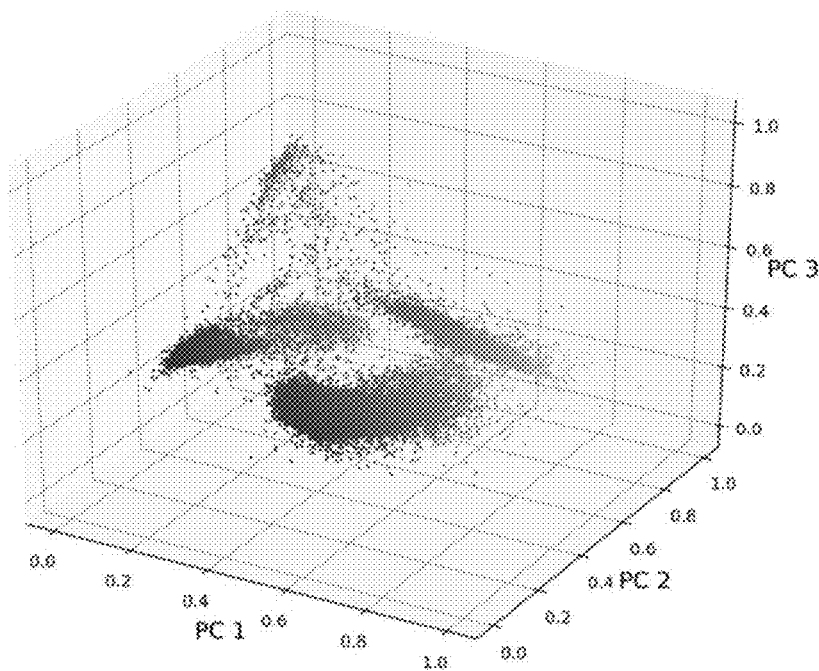
FIG. 17

SUBSPACE APPROACH TO ACCELERATE FOURIER TRANSFORM MASS SPECTROMETRY IMAGING

RELATED APPLICATION

This invention claims the benefit of U.S. Provisional Application No. 63/167,370, filed on Mar. 29, 2021, which is incorporated by reference in its entirety.

BACKGROUND

This disclosure relates to a field of image acquisition, image processing, and/or image analysis, particularly in a technical field related with Fourier transform (FT) mass spectrometry imaging (MSI).

Mass spectrometry imaging is widely used for visualizing and mapping multiple chemical species by determining their ion intensity distribution across a sample surface. Mass resolution, mass accuracy, and acquisition time are all interrelated when using FT instruments because the longer the acquisition time, the more precisely one can determine the frequency of the ion cyclotron motion. When tens of thousands of spectra are obtained for MSI, acquiring the data with high mass resolution, mass accuracy, spatial resolution, and/or large tissue coverage leads to exceedingly long acquisition times, limiting its efficiency and/or throughput.

The present disclosure describes various embodiments for obtaining high-mass-resolution mass spectra and chemical maps from a sample using Fourier transform (FT) mass spectrometry (FT-MS) and a subspace imaging approach, addressing at least one of the issues/problems discussed above, shortening imaging acquisition time, increasing efficiency, and improving the technology field of image acquisition/processing/analysis.

SUMMARY

The present disclosure relates to methods, apparatus, and non-transitory computer readable storage medium for obtaining a Fourier transform (FT) mass spectrometry (FT-MS) image on a sample using a subspace approach.

The present disclosure describes a method for obtaining a Fourier transform (FT) mass spectrometry (FT-MS) image on a sample using a subspace approach. The method includes conducting, by a device, a data collection process that generates nonuniform lengths of FT-MS data across different spatial locations on a sample, the FT-MS data comprising a first set of image data corresponding to a first group of spatial positions on the sample and a second set of image data corresponding to a second group of spatial positions on the sample. The device includes a memory storing instructions and a processor in communication with the memory. The method also includes conducting, by the device, a decomposition process on the first set of image data to obtain a set of basis elements for the sample; performing, by the device, a reconstruction process on a second set of image data based on the set of basis elements to obtain a set of reconstructed image data; performing, by the device, a first Fourier transform on the first set of image data to obtain a first set of mass spectra, the first set of mass spectra corresponding to the first group of spatial positions on the sample; performing, by the device, a second Fourier transform on the set of reconstructed image data to obtain a second set of mass spectra, the second set of mass spectra corresponding to the second group of spatial positions on the sample; and obtaining, by the device, a FT-MS image for the sample based on the first set of mass spectra and the second set of mass spectra.

The present disclosure describes an apparatus for obtaining a Fourier transform (FT) mass spectrometry (FT-MS) image on a sample using a subspace approach. The apparatus includes: a memory storing instructions; and a processor in communication with the memory. When the processor executes the instructions, the processor is configured to cause the apparatus to perform: conducting a data collection process that generates nonuniform lengths of FT-MS data across different spatial locations on a sample, the FT-MS data comprising a first set of image data corresponding to a first group of spatial positions on the sample and a second set of image data corresponding to a second group of spatial positions on the sample, conducting a decomposition process on the first set of image data to obtain a set of basis elements for the sample, performing a reconstruction process on a second set of image data based on the set of basis elements to obtain a set of reconstructed image data, performing a first Fourier transform on the first set of image data to obtain a first set of mass spectra, the first set of mass spectra corresponding to the first group of spatial positions on the sample, performing a second Fourier transform on the set of reconstructed image data to obtain a second set of mass spectra, the second set of mass spectra corresponding to the second group of spatial positions on the sample, and obtaining a FT-MS image for the sample based on the first set of mass spectra and the second set of mass spectra.

The present disclosure describes a non-transitory computer readable storage medium storing computer readable instructions. The computer readable instructions, when executed by a processor, are configured to cause the processor to perform: conducting a data collection process that generates nonuniform lengths of FT-MS data across different spatial locations on a sample, the FT-MS data comprising a first set of image data corresponding to a first group of spatial positions on the sample and a second set of image data corresponding to a second group of spatial positions on the sample; conducting a decomposition process on the first set of image data to obtain a set of basis elements for the sample; performing a reconstruction process on a second set of image data based on the set of basis elements to obtain a set of reconstructed image data; performing a first Fourier transform on the first set of image data to obtain a first set of mass spectra, the first set of mass spectra corresponding to the first group of spatial positions on the sample; performing a second Fourier transform on the set of reconstructed image data to obtain a second set of mass spectra, the second set of mass spectra corresponding to the second group of spatial positions on the sample; and obtaining a FT-MS image for the sample based on the first set of mass spectra and the second set of mass spectra.

The present disclosure also describes a system including circuitry configured to implement any of the above methods.

The present disclosure also describes a product manufactured by any of the above methods.

BRIEF DESCRIPTION OF THE DRAWINGS

The system, device, product, and/or method described below may be better understood with reference to the following drawings and description of non-limiting and non-exhaustive embodiments. The components in the drawings are not necessarily to scale. Emphasis instead is placed upon illustrating the principles of the present disclosure. The patent or application file contains at least one drawing executed in color. Copies of this patent or patent application publication with color drawing(s) will be provided by the Office upon request and payment of the necessary fee.

FIG. 3 shows a flow diagram of an embodiment of a method for obtaining a FT-MS image on a sample using a subspace approach.

FIG. 9B shows another portion of principal component analysis (PCA) results from original data and reconstructed data in an exemplary embodiment.

FIG. 13 shows spectral reconstruction evaluation for an exemplary embodiment.

FIG. 14 shows spectra reconstructed using different numbers of basis transients for an exemplary embodiment.

FIG. 15 shows distribution of the Pearson correlation between ion images for an exemplary embodiment.

FIG. 17 shows scatter plot of the color-coded PCA scores for an exemplary embodiment.

DETAILED DESCRIPTION OF THE DISCLOSURE

Figure 1A:
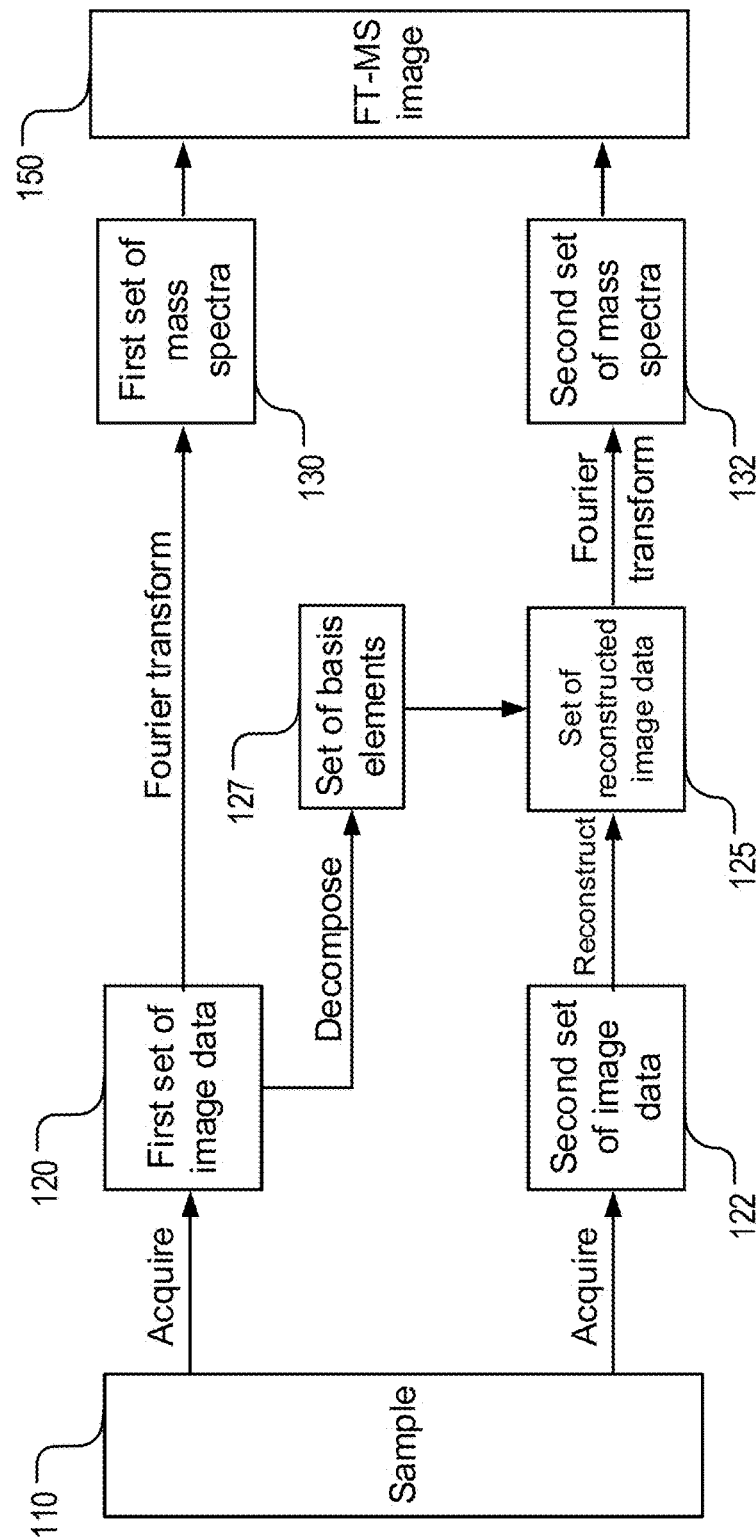
FIG. 1A shows a schematic diagram for various embodiments for obtaining a Fourier transform (FT) mass spectrometry (FT-MS) image on a sample using a subspace approach.

The disclosed systems, devices, and methods will now be described in detail hereinafter with reference to the accompanied drawings that form a part of the present application and show, by way of illustration, examples of specific embodiments. The described systems and methods may, however, be embodied in a variety of different forms and, therefore, the claimed subject matter covered by this disclosure is intended to be construed as not being limited to any of the embodiments. This disclosure may be embodied as methods, devices, components, or systems. Accordingly, embodiments of the disclosed system and methods may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter may include combinations of exemplary embodiments in whole or in part. Moreover, the phrase "in one implementation", "in another implementation", "in some implementations", or "in some other implementations" as used herein does not necessarily refer to the same implementation(s) or different implementation(s). It is intended, for example, that claimed subject matter may include combinations of the disclosed features from the implementations in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various embodiment for a subspace method that accelerates data acquisition using Fourier transform (FT) mass spectrometry (MS) imaging (FT MSI). The FS MSI may include Fourier transform-ion cyclotron resonance (FT-ICR) MSI and/or a Fourier transform Orbitrap MSI.

Mass spectrometry imaging is widely used for visualizing and mapping multiple chemical species by determining their ion intensity distribution across a sample surface. Mass resolution, mass accuracy, and acquisition time are all interrelated when using FT instruments because the longer the acquisition time, the more precisely one can determine the frequency of the ion cyclotron motion. When tens of thousands of spectra are obtained for MSI, acquiring the data with high mass resolution, mass accuracy, spatial resolution, and/or large tissue coverage leads to exceedingly long acquisition times, limiting its efficiency and/or throughput.

The present disclosure describes various embodiments for obtaining a Fourier transform (FT) mass spectrometry (FT-MS) image on a sample using a subspace approach, addressing at least one of the issues/problems discussed above, shortening imaging acquisition time, increasing efficiency, and improving the technology field of image acquisition/processing/analysis.

In various embodiments, for mass spectrometry image (MSI) of biological tissue samples, there is a finite number of heterogeneous tissue types with distinct chemical profiles that introduces redundancy in the high-dimensional measurements. A subspace model may be used to exploit the redundancy in data measured from whole-slice tissue samples by decomposing the transient signals into linear combinations to form a set of basis transients (or a set of basis elements) with the desired spectral resolution. Decomposing transient signals may enable a design with a strategy that acquires a subset of long transients for basis determination and short transients for the remaining pixels, drastically reducing acquisition time. The computational reconstruction strategy may maintain high mass resolution and spatial resolution MSI while providing improvement in throughput, e.g., ten-fold improvement. The capability of the subspace model may be validated using a rat sagittal brain slice imaging dataset. Comprehensive evaluation of the quality of the mass spectral and ion images demonstrated that the reconstructed data produced by the reported method may require only a small portion (e.g., 15%) of the typical acquisition time and exhibit both qualitative and quantitative consistency when compared to the original data. The present disclosure enables either higher sample throughput or higher resolution images at similar acquisition lengths, providing greater flexibility in obtaining FT-ICR MSI measurements.

Figure 1B:
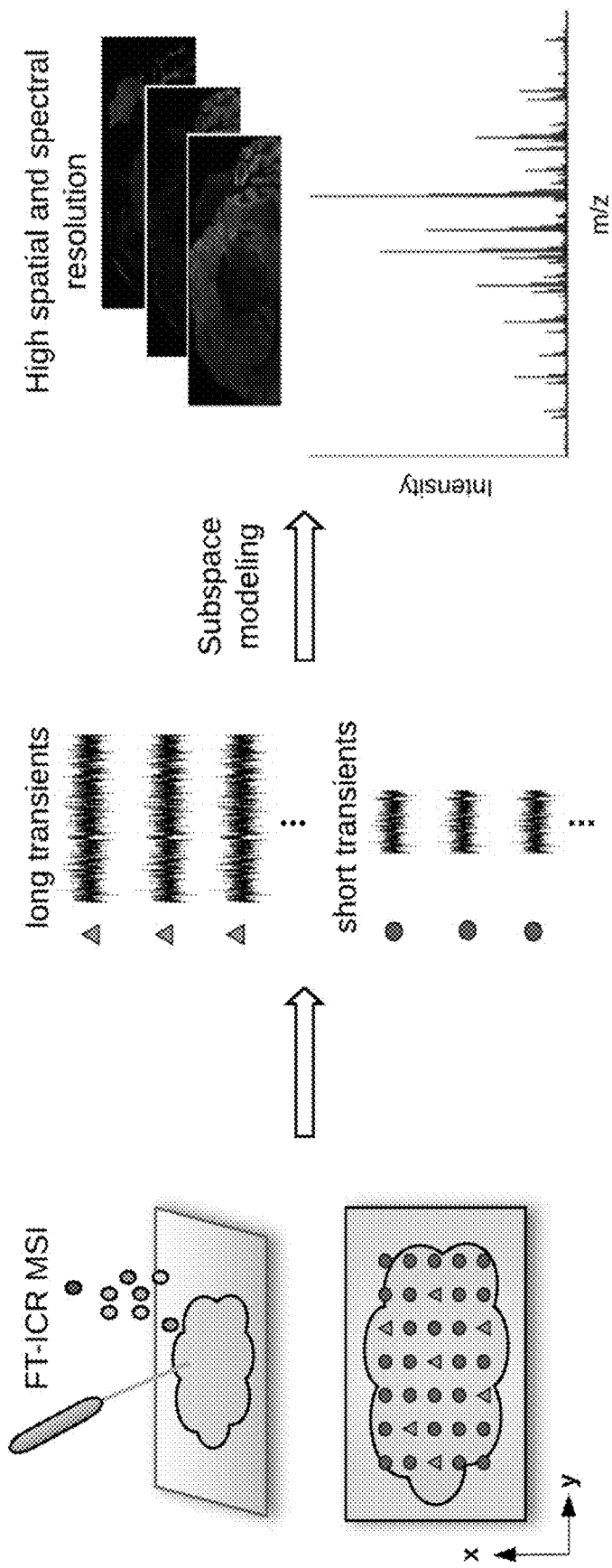
FIG. 1B shows another schematic diagram for various embodiments with fast acquisition and reconstruction for obtaining FT-MS image on a sample using a subspace approach.

FIGS. 1A and 1B show exemplary schematic diagrams of an embodiment 100 for obtaining a Fourier transform (FT) mass spectrometry (FT-MS) image on a sample using a subspace approach. The embodiment 100 may output an FT-MS image 150 of a sample 110. A first set of image data 120 and a second set of image data 122 may be obtained from the sample. The first set of image data may include a smaller number (e.g., about 1,000, about 2,000, about 4,000, about 6,000, or about 8,000) of positions from the sample, which may be denoted as a first group of positions, and include a longer transient duration (e.g., about 0.5 second, about 0.73 second, about 1 second, or about 2 second) for each position (or pixel), which corresponds to higher-resolution mass spectra at a lower spatial resolution The second set of image data may include a larger number (e.g, about 20,000, about 40,000, about 80,000, about 150,000, or about 400,000) of positions from the sample, which may be denoted as a second group of positions, and include a shorter transient duration (e.g., about 0.01 second, about 0.03 second, about 0.037 second, about 0.05 second, or about 0.1 second) for each position (or pixel), which corresponds to a lower-resolution mass spectra at a higher spatial resolution. Here in the present disclosure, "about" a value may refer to a range of ±10% of the value, inclusive.

The first set of image data having the longer transient duration is decomposed to obtain a set of basis elements 127 (or a set of basis transients). The second set of image data having the shorter transient duration is reconstructed, based on the obtained set of basis elements 127, to form a set of reconstructed image data 125. The set of reconstructed image data may have longer transient duration than that of the second set of image data. The set of reconstructed image data 125 may undergo a Fourier transform to obtain a second set of mass spectra 132, which include a mass spectrum for each position in the second group of positions. The FT-MS image 150 may be formed based on the second set of mass spectra, i.e., a mass spectrum for each position (or pixel) in the second group of positions of the sample. As an output, the FT-MS image 150 may be displayed in a graphic display, may be saved in a storage device, and/or may be printed by a printing device.

In some implementations, the first set of image data 120 may undergo a Fourier transform to obtain a first set of mass spectra 130, which include a mass spectrum for each position in the first group of positions. The FT-MS image 150 may be formed based on the first set of mass spectra and the second set of mass spectra, i.e., a mass spectrum for each position (or pixel) in the first and second groups of positions of the sample. When the first and second groups of positions include a same position, the mass spectrum from the first set of mass spectra may be selected over the mass spectrum from the second set of mass spectra. Alternatively and optionally, when the first and second groups of positions include a same position, because there is already image data with longer transient duration for this position, the same position may not undergo the reconstruction process to save computing power and/or reduce computing time, and thus, the set of reconstructed image data may not include reconstructed data for this same position.

Figure 2A:
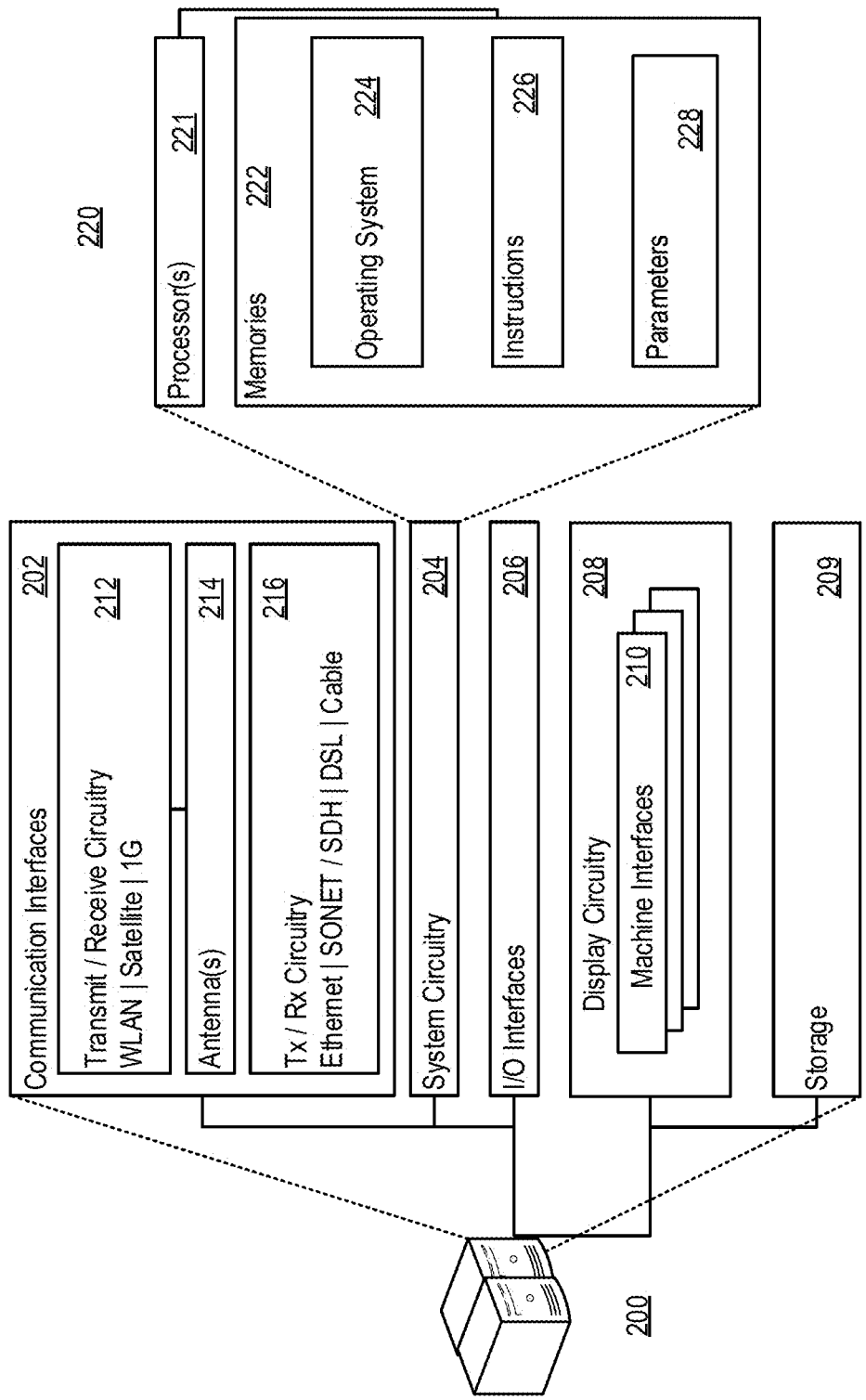
FIG. 2A shows a computer system that may be used to implement various components in an apparatus/device or various steps in a method described in the present disclosure.
Figure 2B:
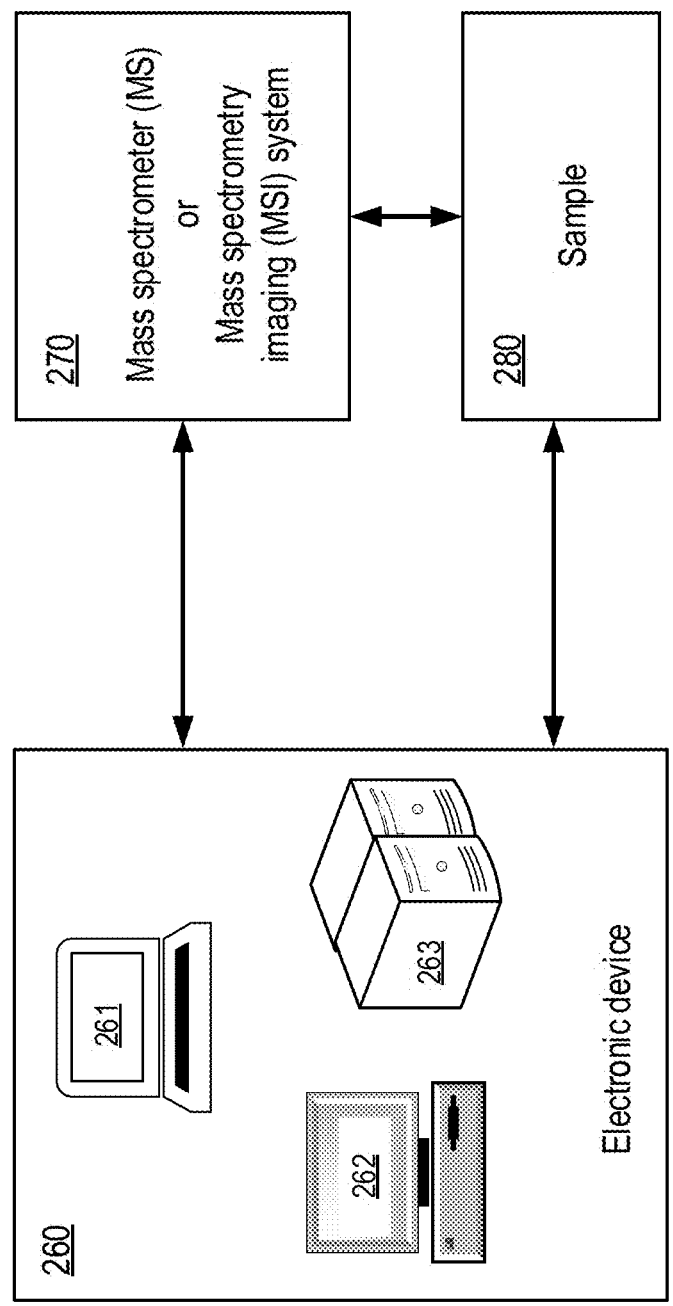
FIG. 2B shows an exemplary system that may be used to implement various embodiments described in the present disclosure.

FIG. 2B shows an exemplary system 250 for obtaining a Fourier transform (FT) mass spectrometry (FT-MS) image on a sample using a subspace approach, which may include a portion or all of the following: one or more electronic device 260, a mass spectrometer (MS) or mass spectrometry imaging (MSI) system 270, and/or a sample 280. The electronic device 260 may communicate with the MS/MSI system 270 to control the MS/MSI system to obtain MS data from the sample 280. The electronic device 260 may include a portion or all of the following: a laptop computer 261, a desktop computer 262, a data server 263, an application server 263, or any other electronic device.

FIG. 2A shows an exemplary system (e.g., the electronic device 260) for obtaining a Fourier transform (FT) mass spectrometry (FT-MS) image on a sample using a subspace approach, which may include a computer system 200 for implementing one or more steps in various embodiments of the present disclosure. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. For one example, the computer system 200 may communicate with one or more instrument (e.g., a mass spectrometer, as shown in FIG. 2B). For another example, the computer system 200 may not directly communicate with MS/MSI, but indirectly obtain MS-related data of a sample (e.g., from a data server or a storage device), and then may process raw data to obtain FS-MS images of the sample using a subspace approach as described in the present disclosure.

The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, general purpose digital interface (GPIB), peripheral component interconnect (PCI), PCI extensions for instrumentation (PXI), memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for implementing the embodiment for determining at least one reaction condition. These data corpus may alternatively be stored in a database 118. In one implementation, the storage 209 of the computer system 200 may be integral with a database. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, at least some of the system circuitry 204 may be implemented as processing circuitry 220. The processing circuitry 220 may include one or more processors 221 and memories 222. The memories 222 stores, for example, control instructions 226, parameters 228, and/or an operating system 224. The control instructions 226, for example may include instructions for implementing various components of the embodiment for determining at least one reaction condition. In one implementation, the instruction processors 221 execute the control instructions 226 and the operating system 224 to carry out any desired functionality related to the embodiment for determining at least one reaction condition.

In some embodiments, a method for obtaining a Fourier transform (FT) mass spectrometry (FT-MS) image on a sample using a subspace approach may be implemented in a device comprising memory storing instructions and a processor in communication with the memory, for example, a computer. The memory may be used to store one or more parameters, hyperparameters, acquired data, intermediate data, and/or final output data. The memory may further include applications and various data structures, for example, templates, (x, y) coordinates, or one or more other data structures to the mass spectra and/or Fourier transform. The processor may execute the instruction in the memory and may provide support to implement the various tasks performed by the system. The device may further include a user interface that may include machine-machine interface, man-machine interfaces, and/or graphical user interfaces (GUI). The GUI may be used to present interfaces and/or options to operators involved in input of control instructions, parameters, and/or viewing results.

The present disclosure describes various embodiments of methods and/or apparatus for obtaining a Fourier transform (FT) mass spectrometry (FT-MS) image on a sample using a subspace approach, which may include or be implemented by an electric device/system as shown in FIGS. 2A and 2B.

Referring to FIG. 3, the present disclosure describes various embodiments of a method 300 for obtaining a Fourier transform (FT) mass spectrometry (FT-MS) image on a sample using a subspace approach. The method 300 may include a portion or all of the following steps: step 310, conducting a data collection process that generates nonuniform lengths of FT-MS data across different spatial locations on a sample, the FT-MS data comprising a first set of image data corresponding to a first group of spatial positions on the sample and a second set of image data corresponding to a second group of spatial positions on the sample; step 320, conducting a decomposition process on the first set of image data to obtain a set of basis elements for the sample; step 330, performing a reconstruction process on a second set of image data based on the set of basis elements to obtain a set of reconstructed image data; step 340, performing a first Fourier transform on the first set of image data to obtain a first set of mass spectra, the first set of mass spectra corresponding to the first group of spatial positions on the sample; step 350, performing a second Fourier transform on the set of reconstructed image data to obtain a second set of mass spectra, the second set of mass spectra corresponding to the second group of spatial positions on the sample; and/or step 360, obtaining a FT-MS image for the sample based on the first set of mass spectra and the second set of mass spectra.

In some implementations, a number of basis elements in the set of basis elements comprises an integer between 10 and 2000, inclusive.

In some implementations, the number of basis elements in the set of basis elements comprises 250.

In some implementations, the set of the basis elements provides a desired mass resolution specified by a user.

In some implementations, the reconstruction process in step 330 corresponding to the second set of mass spectra may be performed in either a location-by-location fashion or jointly for all the second group of spatial positions simultaneously, or both.

In some implementations, the first set of image data corresponds to data with a first transient duration; the second set of image data corresponds to data with a second transient duration; and/or the second transient duration is shorter than the first transient duration. In some implementations, the second transient duration is at least 10 times shorter than the first transient duration. In some implementations, the first transient duration comprises about 0.734 second. In some implementations, the second transient duration comprises about 0.037 second.

In some implementations, the first set of image data corresponds to a FT MS image with a first mass resolution; the second set of image data corresponds to a FT MS image with a second mass resolution; and/or the first mass resolution is finer than the second mass resolution.

In some implementations, the first group of spatial positions comprises a first number of spatial positions; the second group of spatial positions comprises a second number of spatial positions; and/or the first number is smaller than the second number.

In some implementations, the first group of spatial positions is randomly selected on the sample.

In some implementations, the decomposition process comprises a singlular value decomposition or other types of matrix decomposition methods.

In some implementations, the FT MS image comprises at least one of the following: a Fourier transform ion cyclotron resonance (FT-ICR) mass spectrometry image; or a Fourier transform Orbitrap mass spectrometry image.

In some implementations, the FT-ICR mass spectrometry image corresponds to data acquired in a mass analyzer using a magnetic field to confine a plurality of ions.

In some implementations, the Fourier transform Orbitrap mass spectrometry image corresponds to data acquired in a mass analyzer using an electric field to confine a plurality of ions.

In some implementations, the first mass resolution is at least 10 times finer than the second mass resolution.

In some implementations, the method 300 may optionally include conducting, by the device, a reconstruction process on a third set of image data based on the set of basis elements to obtain a third set of reconstructed image data, the third set of image data corresponding to a third group of spatial positions on the sample; performing, by the device, a Fourier transform on the third set of reconstructed image data to obtain a third set of mass spectra, the third set of mass spectra corresponding to the third group of spatial positions on the sample; and/or obtaining, by the device, the FT MS image for the first group of spatial positions on the sample based on the first set of mass spectra and for the third group of spatial positions on the sample based on the third set of mass spectra.

In some implementations, the first set of image data corresponds to data with a first transient duration; the second set of image data corresponds to data with a second transient duration; the third set of image data corresponds to data with a third transient duration; and/or the third transient duration is shorter than the first transient duration and longer than the second transient duration.

Figure 4A:
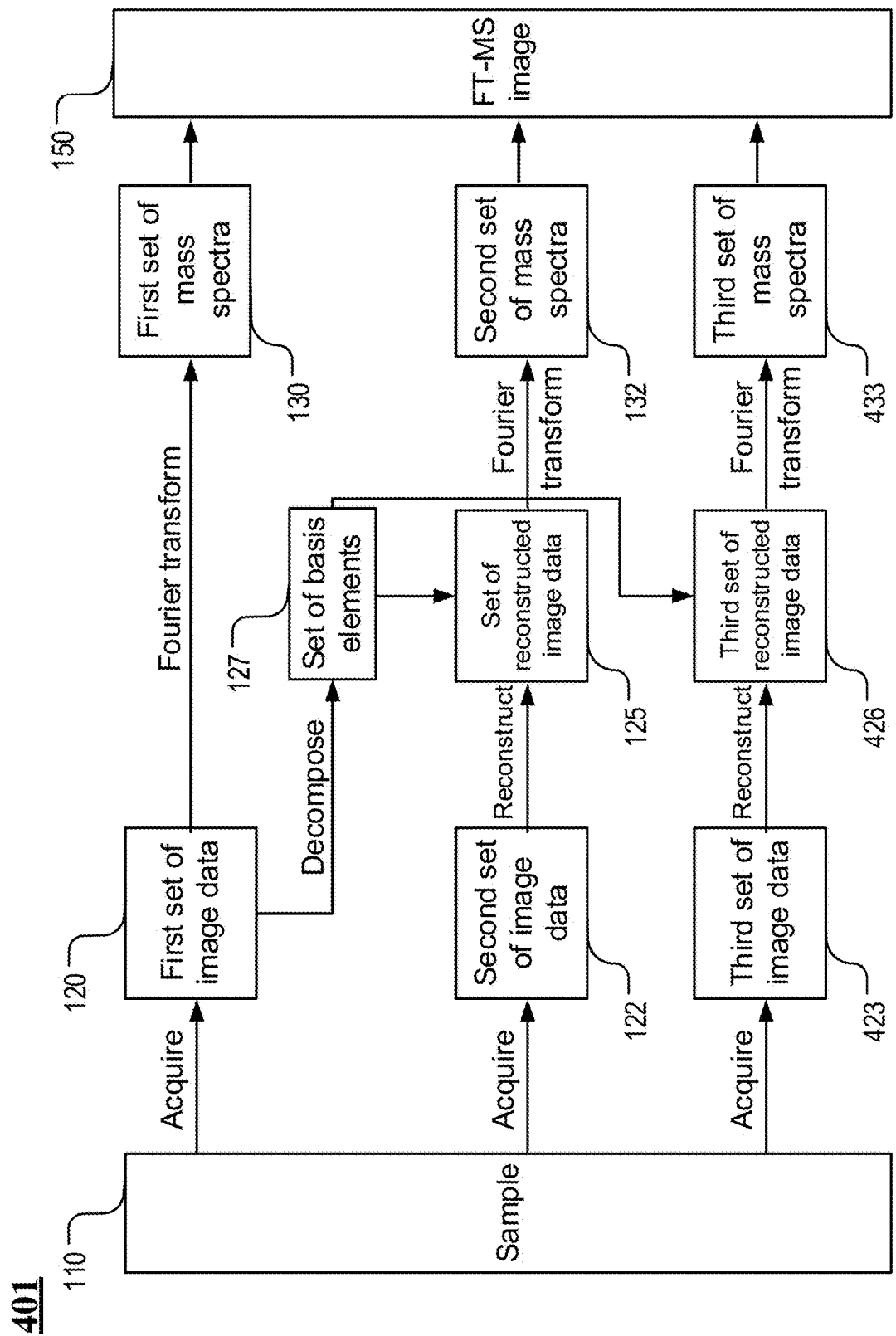
FIG. 4A shows another schematic diagram for various embodiments for obtaining a FT-MS image on a sample using a subspace approach.

FIG. 4A shows another exemplary schematic diagram of an embodiment 401 for obtaining a Fourier transform (FT) mass spectrometry (FT-MS) image on a sample using a subspace approach. The embodiment 401 may output an FT-MS image 150 of a sample 110. The embodiment 401 may have a portion which is similar to the embodiment 100, and may also have another portion which is different from the embodiment 100.

The embodiment 401 may additionally include acquiring a third set of image data 423 from a third group of positions from the sample 110, and the third set of image data 423 may have a much shorter transient duration than that of the first set of image data 120, and may have a shorter transient duration than that of the second set of image data. For example but not limited to, the transient duration of the first set of image data is 8, 10, 20, or 30 times as long as the transient duration of the third set of image data; and/or the transient duration of the second set of image data is 1.2, 1.5, 2, or 3 times as long as the transient duration of the third set of image data.

For example, the embodiment 401 may be used when the sample includes two regions with different levels of interests/priority: a first region with relatively higher interest/priority and a second region with relatively lower interest/priority. The second group of positions corresponding to the second set of image data may locate within the first region; the third group of positions corresponding to the third set of image data may locate within the second region; and/or the first group of positions corresponding to the first set of image data may be randomly locate within the first and second regions. Here in the present disclosure, a "region" may refer to a continuous portion within a sample, or may refer to a set of portions within a sample, wherein the set of portions may not be necessarily continuous.

The third set of image data 423 with a shorter transient duration may be reconstructed, based on the set of basis elements 127, to form a third set of reconstructed image data 426 with a longer transient duration. The third set of reconstructed image data 426 may undergo a Fourier transform to obtain a third set of mass spectra 433, which include a mass spectrum for each position in the third group of positions. The FT-MS image 150 may be formed based on the second and third sets of mass spectra, i.e., a mass spectrum for each position (or pixel) in the second and third groups of positions of the sample. As an output, the FT-MS image 150 may be displayed in a graphic display, may be saved in a storage device, and/or may be printed by a printing device.

Figure 4B:
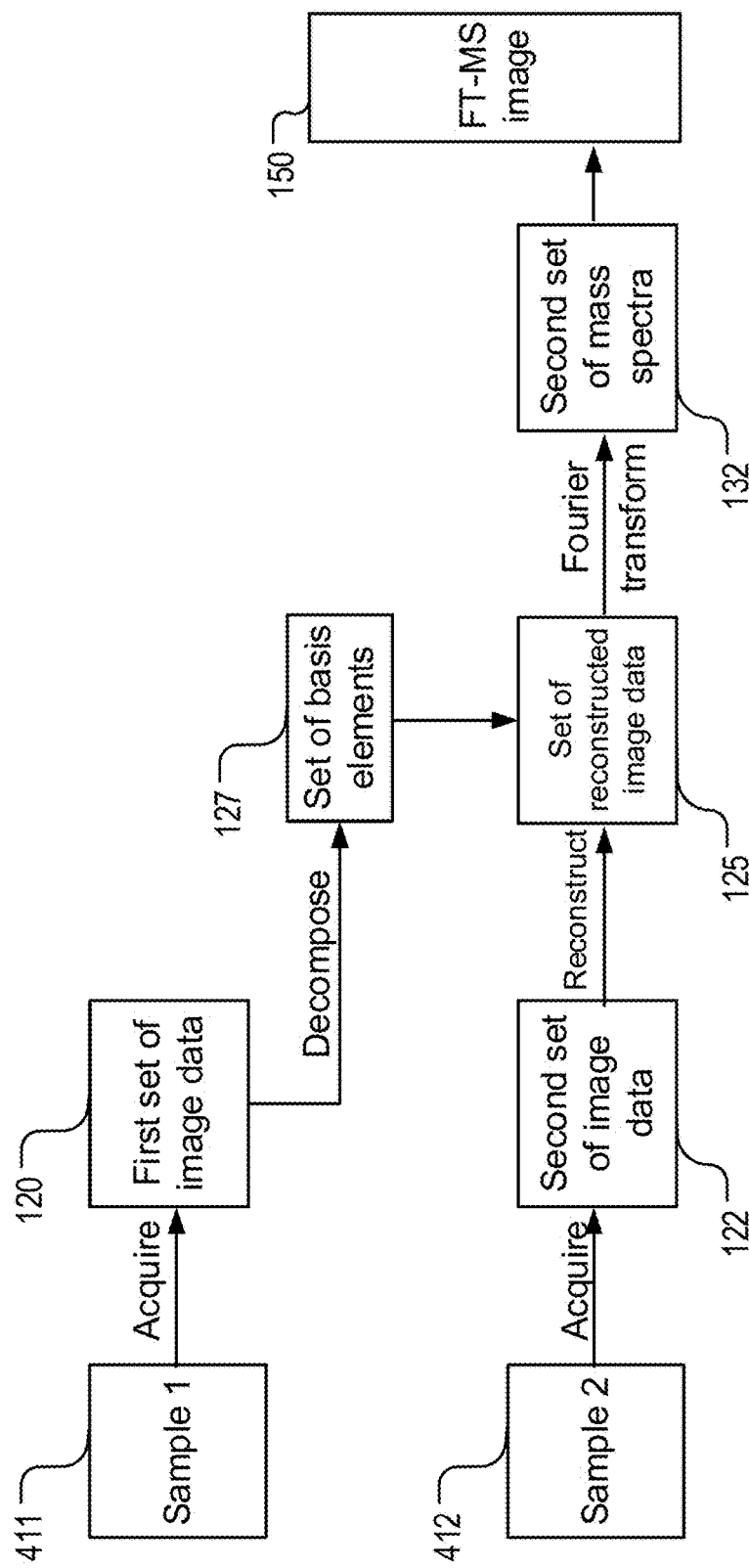
FIG. 4B shows another schematic diagram for various embodiments for obtaining a FT-MS image on a sample using a subspace approach.

FIG. 4B shows another exemplary schematic diagram of an embodiment 403 for obtaining a Fourier transform (FT) mass spectrometry (FT-MS) image on a sample using a subspace approach. The embodiment 403 may output an FT-MS image 150 of a sample 412. The embodiment 403 may have a portion which is similar to the embodiment 100, and may also have another portion which is different from the embodiment 100.

The embodiment 403 may include two samples, a first sample 411 (sample 1) and a second sample 412 (sample 2). The first and second samples may originate from a same source so that the two samples have (or are expected to have) substantially similar set of basis elements; or the first and second samples may originate from different sources but it's determined/expected that the two samples have substantially similar set of basis elements, for example the two samples are obtained from a same experiment at different runs. Therefore, when a set of basis elements is obtained from the first sample, the set of basis elements may be used for the second sample, reducing image data acquisition time and/or increasing efficiency of FT-MS imaging on the second sample.

In the embodiment 403, a first set of image data 120 may be obtained from the first sample 411; and a second set of image data 122 may be obtained from the second sample 412. The first set of image data may include a smaller number (e.g., about 4000) of positions from the first sample, which may be denoted as a first group of positions, and include a longer transient duration (e.g., about 0.73 second) for each position (or pixel). The second set of image data may include a larger number (e.g, about 40,000) of positions from the second sample, which may be denoted as a second group of positions, and include a shorter transient duration (e.g., about 0.037 second) for each position (or pixel).

The first set of image data having the longer transient duration is decomposed to obtain a set of basis elements 127 (or a set of basis transients). The second set of image data having the shorter transient duration is reconstructed, based on the obtained set of basis elements 127, to form a set of reconstructed image data 125. The set of reconstructed image data 125 may undergo a Fourier transform to obtain a second set of mass spectra 132, which include a mass spectrum for each position in the second group of positions. The FT-MS image 150 for the second sample 412 may be formed based on the second set of mass spectra, i.e., a mass spectrum for each position (or pixel) in the second group of positions of the second sample. As an output, the FT-MS image 150 may be displayed in a graphic display, may be saved in a storage device, and/or may be printed by a printing device.

Figure 4C:
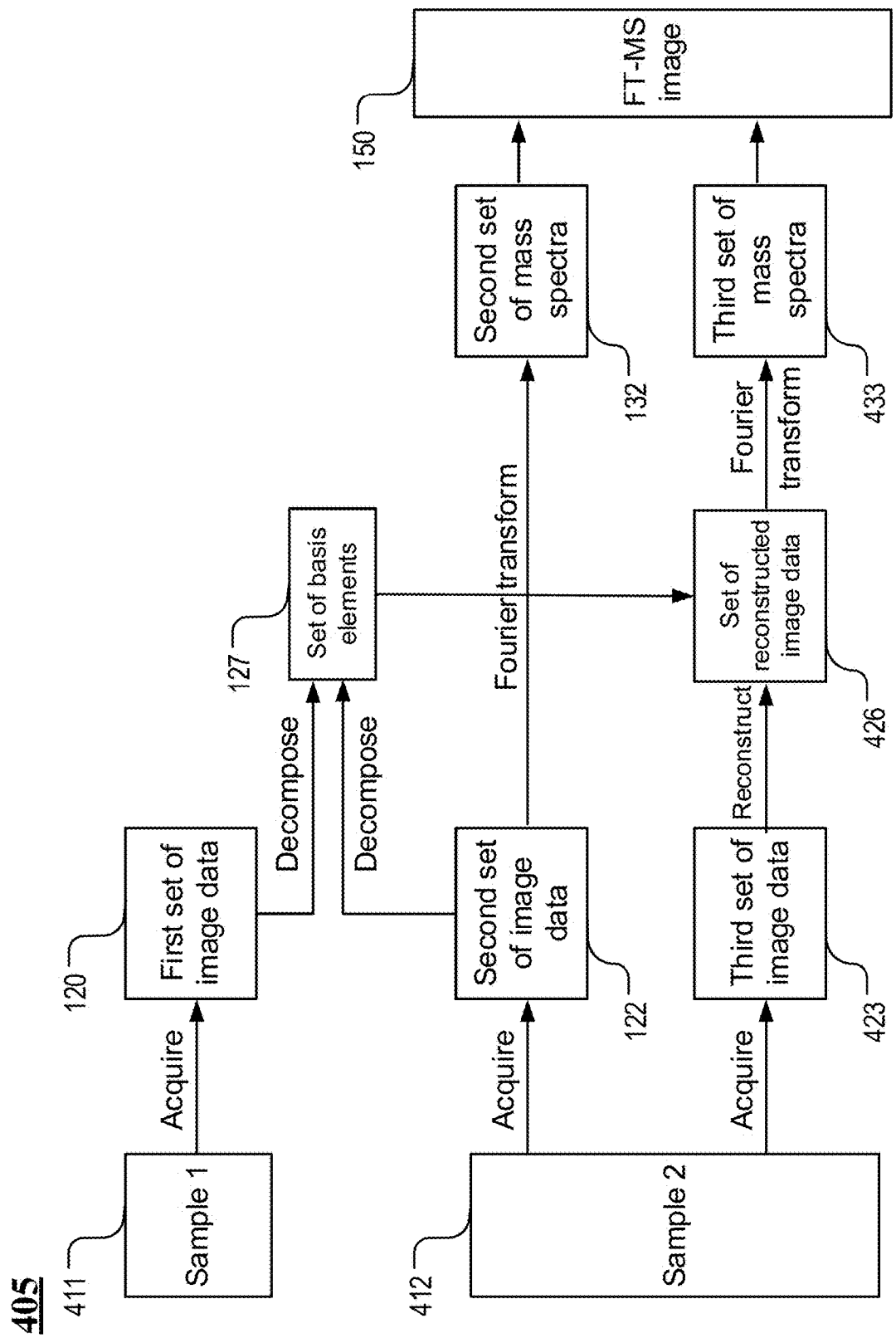
FIG. 4C shows another schematic diagram for various embodiments for obtaining a FT-MS image on a sample using a subspace approach.

FIG. 4C shows another exemplary schematic diagram of an embodiment 405 for obtaining a Fourier transform (FT) mass spectrometry (FT-MS) image on a sample using a subspace approach. The embodiment 405 may output an FT-MS image 150 of a sample 412. The embodiment 405 may have a portion which is similar to the embodiment 403, and may also have another portion which is different from the embodiment 403.

In the embodiment 405, the set of basis elements 127 may be obtained by decomposing the first set of image data from the first sample 411 and the second set of image data from the second sample 412. Thus, the embodiment 405 may save image data acquisition time from the second sample and/or increase efficiency of FT-MS imaging for the second sample.

In the embodiment 405, the first set of image data 120 may be obtained from the first sample 411; the second set of image data 122 may be obtained from the second sample 412; and/or the third set of image data 423 may be obtained from the second sample 412. The first set of image data may include a smaller number (e.g., about 4,000) of positions from the first sample, which may be denoted as a first group of positions, and include a longer transient duration (e.g., about 0.73 second) for each position (or pixel). The second set of image data may include a smaller number (e.g, about 2,000) of positions from the second sample, which may be denoted as a second group of positions, and include a longer transient duration (e.g., about 0.73 second) for each position (or pixel) in the second group of positions. The third set of image data may include a larger number (e.g, about 40,000) of positions from the second sample, which may be denoted as a third group of positions, and include a shorter transient duration (e.g., about 0.037 second) for each position (or pixel).

The first and second sets of image data having the longer transient duration (their transient durations may be the same or different) are decomposed to obtain the set of basis elements 127 (or the set of basis transients). The third set of image data 423 having the shorter transient duration is reconstructed, based on the obtained set of basis elements 127, to form a set of reconstructed image data 426. The set of reconstructed image data 426 may undergo a Fourier transform to obtain a third set of mass spectra 433, which include a mass spectrum for each position in the third group of positions. The FT-MS image 150 for the second sample 412 may be formed based on the third set of mass spectra, i.e., a mass spectrum for each position (or pixel) in the third group of positions of the second sample. As an output, the FT-MS image 150 may be displayed in a graphic display, may be saved in a storage device, and/or may be printed by a printing device.

In some implementations, the second set of image data 122 may undergo a Fourier transform to obtain a second set of mass spectra 132, which include a mass spectrum for each position in the second group of positions. The FT-MS image 150 may be formed based on the second set of mass spectra and the third set of mass spectra, i.e., a mass spectrum for each position (or pixel) in the second and third groups of positions of the second sample. When the second and third groups of positions include a same position, the mass spectrum from the second set of mass spectra may be selected over the mass spectrum from the third set of mass spectra. Alternatively and optionally, when the second and third groups of positions include a same position, because there is already image data with longer transient duration for this position, the same position may not undergo the reconstruction process to save computing power and/or reduce computing time, and thus, the set of reconstructed image data 426 may not include reconstructed data for this same position.

Below, the present disclosure further describes detailed aspects of various embodiments for obtaining a Fourier transform (FT) mass spectrometry (FT-MS) image on a sample using a subspace approach. The present disclosure describes one or more detailed examples, and details related measurements and/or test results in various exemplary embodiments. The present disclosure also describes various examples to validate the capability of the subspace model using rat brain slice imaging data sets as examples. In some embodiments, comprehensive evaluation of the quality of the mass spectral and ion images demonstrated that the reconstructed data produced by the reported method required only 15% of the typical acquisition time and exhibited both qualitative and quantitative consistency when compared to standards with original data.

Various embodiments in the present disclosure may enable higher sample throughput and/or higher-resolution images at similar acquisition lengths, providing greater flexibility in obtaining FT-ICR MSI measurements.

Various embodiments in the present disclosure may also be integrated into the software of any commercial FT-ICR mass spectrometry imaging or FT Orbitrap mass spectrometry imaging instrument or platforms, enabling significant reduction of data collection time (from days to hours) and/or higher resolution chemical imaging, for many different biomolecular studies.

Mass spectrometry imaging (MSI) is widely used for visualizing and mapping multiple chemical species by determining their ion intensity distribution across a sample surface. As an untargeted approach, MSI does not require prior knowledge of the chemical species to be analyzed, a capability that has been exploited for many applications, including clinical diagnostics, drug metabolism studies, and localization/characterization of biomolecules within tissue samples. Among the available ionization methods for MSI, matrix-assisted laser desorption/ionization (MALDI) is frequently used because its soft ionization allows analysis of intact biomolecules over a large range of molecular weights, including metabolites and lipids. These measurements are aided by the advancement of high-resolution mass spectrometers. Fourier transform (FT)-based mass analyzers offer better performance in terms of mass resolution and mass accuracy compared to other routinely used mass analyzers, such as time-of-flight (TOF). In some implementations, FT-ion cyclotron resonance (ICR) mass spectrometry (MS) may provide the highest mass resolution and mass accuracy available.

In some implementations, mass resolution, mass accuracy, and acquisition time are all interrelated when using FT instruments because the longer the acquisition time, the more precisely one can determine the frequency of the ion cyclotron motion. Not surprisingly, higher mass resolution and mass accuracy aid in confident analyte identification. In some implementations, absorption mode processing using a 9.4 Tesla FT-ICR system achieved >250,000 mass resolution (full width half maximum) for multiple lipid species, and a 21 Tesla FT-ICR instrument exceeded 500,000 mass resolution while retaining sub-ppm mass accuracy. Mass resolution is improved with increasing magnetic field strength when the transient length of the acquired time domain signal is constant. Increasing transient length also improves mass resolution and mass accuracy without requiring a larger magnet. There may be practical limits to how long a transient can be acquired because ions will collide with residual molecules inside the ICR cell, restricting the duration for which a transient can be recorded before the signal dies out. Furthermore, for an MSI experiment where oftentimes tens of thousands of spectra are obtained, acquiring the data with high mass resolution, mass accuracy, spatial resolution, and large tissue coverage leads to exceedingly long acquisition times. Although MSI using FT-ICR instruments can achieve significantly better mass resolution and mass accuracy than other approaches, it is limited in throughput if the goal is to obtain the previously mentioned properties simultaneously.

The present disclosure describes a subspace approach to accelerate data acquisition for FT-ICR-based MSI, increasing its throughput. The method maintains high mass resolution and mass accuracy through a subspace-based scanning strategy and a computational reconstruction method with minimal loss of fidelity. In addition to improving throughput, shortening the acquisition time is desirable when working with volatile MALDI matrices because the matrix-coated samples may not remain stable under vacuum throughout an extended imaging experiment.

In some implementations, to improve MSI acquisition, one technique is to acquire higher-resolution mass spectra at a lower spatial resolution during the initial acquisition, and then use a complementary high spatial-resolution imaging modality to enhance the final spatial resolution of the ion images. In some implementations, these complementary modalities may include optical microscopy, electron microscopy, and/or infrared spectroscopy.

In some implementations, to improve MSI acquisition, another approach is to acquire high spatial-resolution data with lower resolution mass spectra at each pixel (i.e., shorter transients for FT-ICR) and use signal processing techniques to enhance the mass spectral resolution. Representative examples include methods that impose parametric models on the temporal signals or on the spectra to achieve spectral "super-resolution" by estimating the model parameters from short transient data and synthesizing higher-resolution spectra using the parameter estimates. In particular, the filter diagonalization method (FDM) can provide higher mass resolution for shorter transients, ultimately speeding up high-resolution FT-ICR MS experiments. In some implementations, applying FDM on the temporal signal may require selection of specific frequency windows and time-consuming, nonlinear parameter fitting of each pixel. For imaging chemically complex tissues with thousands of pixels, each with a large set of frequency peaks, it may become computationally impractical to apply FDM.

In some implementations, several techniques from other imaging modalities may be used for MSI, such as compressed sensing (CS) and super-resolution reconstruction. The CS-based method randomly samples a partial number of pixels and reconstructs hyperspectral images by solving nonlinear optimization problems, thus effectively reducing the data acquisition time. These methods have yet to take full advantage of the inherent redundancy in the high-resolution, high-dimensional MSI data. Some implementations focus on the instrumentation and data processing to improve the data acquisition efficiency for FT-ICR MS, but may require highly modified systems that may hinder their wide-spread application.

Figure 5:
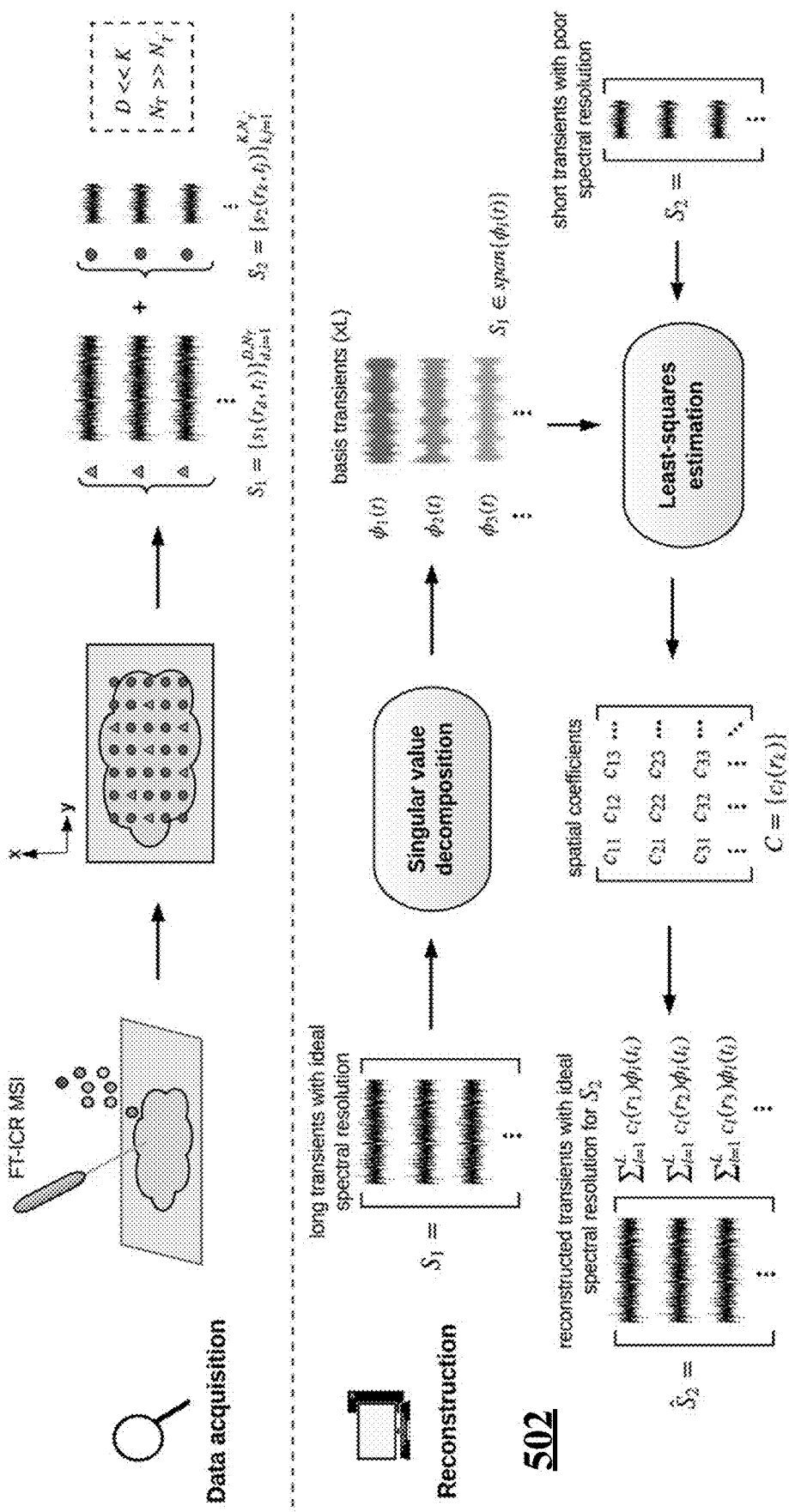
FIG. 5 shows a subspace-based FT-MS imaging for an exemplary embodiment.

FIG. 5 shows a schematic diagram of various embodiments including an approach to accelerate FT-ICR MSI by exploiting the low-rank property of the high-dimensional hyperspectral function, i.e., the ensemble of spatially resolved temporal transients from a tissue imaging dataset to form an approximately low-rank matrix. This low-rank property indicates that the desired long temporal transients, although high dimensional, reside in a lower-dimensional subspace, meaning they may be accurately approximated using a small number of basis elements, each of which captures a unique set of frequency components. As a result, if the basis can be predefined, determination of the transient at each pixel may be formulated as the estimation of a small set of weighting coefficients that linearly combine with the basis to synthesize the desired high-resolution transient. This enables the use of special acquisition and reconstruction strategies to achieve fast FT-ICR MSI with simultaneous high mass and high spatial resolution.

In some implementations, referring to the data acquisition section 501, long transients with the desired mass resolution may be sampled/acquired from a randomly selected subset of pixels on the tissue sample (e.g., 10% of the total number of pixels). The remaining pixels are sampled with much shorter transients (e.g., 5% of the original long transient length). During reconstruction section 502, the measured long transients are used to estimate the basis transients of the subspace model, which will then be used to reconstruct long transients from the acquired short transients through a least-squares fitting for the entire tissue sample.

FIG. 5 shows a schematic diagram of subspace-based imaging for FT-ICR MSI. The data acquisition section 501 may include the measurement of two complementary datasets: the triangles indicate the acquisition of transient set $S_1$ with the desired spectral resolution (long transient duration T) at random tissue locations that should cover most heterogeneous tissue types. The circles indicate the larger transient set $S_2$ acquired with a shorter transient duration T' (T'<<T) acquired at the rest of tissue locations with the desired spatial resolution. The reconstruction section 502 may include an estimation of basis transients (the subspace) with the desired spectral resolution from $S_1$ through singular value decomposition, and fitting of spatial coefficients for individual transients in $S_2$ through least-squares estimation using the predefined subspace. The fitted coefficients are then used as weights for the basis transients to reconstruct long transients for all pixels with the desired spectral resolution. This acquisition and reconstruction strategy significantly improve the data acquisition efficiency without compromising the spectral resolution and mass accuracy, while providing high reconstruction fidelity to recover accurate chemical information from the whole tissue section.

The capability of the subspace-based method to accelerate high-resolution MSI data acquisition on whole-slide tissue samples may be demonstrated on a rat sagittal brain slice with 39,775 pixels at a spatial resolution of 50 μm acquired using a 7 Tesla (T) FT-ICR mass spectrometer. The MSI data from the conventional long transient acquisition, which serves as the gold standard, versus the reconstructed data using accelerated acquisition, exhibited both qualitative and quantitative consistency. The required time for the acquisition is eight-fold shorter than the original standard acquisition approach. The subspace-based method may achieve considerable improvement over a standard acceleration strategy that acquires uniformly short transients for all pixels with an equivalent acquisition time. Furthermore, the mass spectra and ion images produced by the subspace-based method may exhibit improved signal-to-noise ratios (SNRs) and higher contrast, which may be due to the denoising effects introduced by the dimensionality reduction of the subspace model.

In some implementations, the subspace approach may also be combined with CS-based methods or other spatial resolution-enhancing techniques (such as using complementary imaging modalities) to achieve further improvements by introducing a spatial regularization term into the reconstruction formulation. The acceleration capability provided by the subspace method may be useful for increasing the throughput of high-resolution MSI without compromising mass and spatial resolution, or for obtaining higher-resolution images without substantially increasing imaging time.

Subspace Theory and Calculation

For FT MS, the individual pixels are acquired as temporal signals called transients. The transients are combinations of many sinusoidal components corresponding to individual m/z values that can be resolved after Fourier transformation. Let $N_r$ denote the number of pixels to scan over the tissue sample of interest, and T the duration of each transient, which depends on the sampling time interval determined by the mass range of interest and the number of sampled points per transient $N_T$, to achieve a specific spectral resolution, making the total acquisition time for a standard uniform scanning paradigm $N_r \times T$. Thus, the acquisition time can be prohibitively long if very high-resolution imaging over a large tissue section is desired.

The unique physical property of temporal transient-based sampling enables the use of a special subspace modeling strategy for faster scanning and reconstruction. A subspace approach for magnetic resonance spectroscopic imaging may be adapted. For MSI, this model may assume each transient, though containing many frequency components, may be accurately approximated by a linear combination of a substantially smaller number of basis functions, denoted by $\{\phi_l(t)\}_{l=1}^{L}$, which are also referred to as the temporal basis transients. Thus, when denoting the high-dimensional MSI function of interest as $s(r, t)$, with $s(r_n, t)$, $n=1,2, \ldots, N_r$, the transient of interest with the desired mass spectral resolution at a specific pixel $r_n$, the subspace model of $s(r_n, t)$ may be mathematically expressed as:

$$s(r_n, t) = \sum_{l=1}^{L} c_l(r_n) \phi_l(t) \quad \text{(Eq. 1)}$$

where $\{c_l(r_n)\}_{l=1}^{L}$ are a set of coefficients that specify the pixel-dependent contributions of the L basis functions to construct the transients of interest, and L is the model order, which can be defined by users and expected to be much smaller than $N_T$. This model may imply that when $\phi_l(t)$ can be predetermined, the imaging problem may be transformed into the estimation of $c_l(r)$ instead of sampling and reconstructing the long transients for individual pixels independently. Since the degrees of freedom of $c_l(r)$ are dramatically smaller than the original high-dimensional $s(r, t)$ (from $N_r \times N_T$ to $N_r \times L$), the subspace model enables a potentially significant accelerated acquisition by reducing the number of temporal samples needed for each pixel from the tissue section because the spectral resolution here is specified by the predefined $\phi_l(t)$. For a discretized representation of the MSI data, the Casorati matrix S composed of temporal samples of all the pixels may be a low-rank matrix with rank=L. Therefore, new approaches may be designed for spatial scanning and reconstruction for MSI with simultaneous high-spatial and -spectral resolution, as described in the following paragraphs.

The description of the present disclosure turns to a topic of transient subspace estimation and whole tissue MSI reconstruction. Based on the model in Eq. (1), the imaging problem becomes two decoupled steps. The first estimates the transient basis $\{\phi_l(t)\}$ and the second estimates the spatial coefficients $\{c_l(r)\}$. Moreover, only a small subset of transients is needed for determining $\{\phi_l(t)\}_{l=1}^{L}$ because the number of basis vectors L required to capture the majority of the energy of the data matrix is small (e.g., in a test data set, a rank of 100 can already capture more than 95% of the signal variations for a large set of long transients, as illustrated in FIG. 2). To this end, the following sampling strategy may be proposed to acquire two complementary datasets, $S_1 = \{s_1(r_d, t_i)\}_{d,i=1}^{D,N_T}$ with long transients of duration T for a random subset of D pixels to determine the basis transients $\{\phi_l(t_i)\}_{i=1}^{N_T}$ with the desired spectral resolution, and $S_2 = \{S_2(r_k, t_j)\}_{k,j=1}^{K,N_{T'}}$ with K short transients of duration T' covering the rest of the tissue slice with high spatial resolution (note that K>>D and T'<<T). The reconstruction is then performed as follows. The data in $S_1$ are used to form a $D \times N_T$ Casorati matrix, and singular value decomposition (SVD) is applied to this matrix to extract the basis from the right singular vectors (see the Supporting Information). Based on the SVD, L was chosen such that the truncation error was small (<3%). With $\phi_l(t)$ estimated, the coefficients can be determined from the short transients $S_2$ by a regularized least-squares fitting:

$$\hat{C} = \arg \min_{C} \|S_2 - C\Phi\|_2^2 + \alpha \|C\|^2 \quad \text{(Eq. 2)}$$

where the first term is a data consistency measures, $\Phi$ is a matrix with each row being a basis transient evaluated up to T' to match the transient length of the data in $S_2$, and C is a matrix with each row containing the spatial coefficients for a pixel. The second term in the equation is a regularization term to stabilize the fitting with a being a small regularization parameter. This problem may be solved with a closed-form solution:

$$\hat{C} = (\Phi^H \Phi + \alpha I)^{-1} \Phi^H S_2. \quad \text{(Eq. 3)}$$

Finally, the long transients at pixels $r_k$, k=1,2 ... K may be reconstructed as a linear combination of $\{\phi_l(t_i)\}$ with a desired transient duration T, weighted by the estimated coefficients $\hat{C}$ as follows:

$$\hat{s}_2(r_k, t_i) = \sum_{l=1}^{L} \hat{c}_l(r_k) \phi_l(t_i). \quad \text{(Eq. 4)}$$

Details in Various Methods

The description of the present disclosure turns to a topic of sample preparation, matrix application, and/or MSI. The rat sagittal brain slice was prepared and imaged to generate 39,775 pixels. MSI was performed on a mass spectrometer, for example, solariX 7T MALDI FT-ICR mass spectrometer from Bruker Corp., which is equipped with an atmospheric pressure ionization dual ESI/MALDI source operating at ~2.65 mbar. A mass window of m/z 150-1200 was selected, yielding transients with 0.734 second (s) duration, which resulted in a resolving power of 93,000 at m/z 700. MALDI mass spectra were acquired in positive-mode using a laser, for example, a smartbeam-II UV laser from Bruker Corp., in 'minimum' mode with a 50-µm raster width. Each MALDI acquisition may include 400 laser shots at a frequency of 1000 Hz. External calibration was performed, for example, using PepMix II from Bruker Corp. The total time for data acquisition was 8 hour (h) and the entire imaging experiment took 15 h, with an ~0.85 s measurement overhead per pixel (e.g., time spent on multiple laser shots, ion accumulation, stage movement, and some online processing). The acquired dataset was used as the gold standard to evaluate the subspace approach. These measurement overheads may be instrument- and experiment-dependent, and may be further reduced by optimizing various experimental parameters.

The description of the present disclosure turns to a topic of evaluation of reconstruction. The subspace model may be evaluated by randomly sampling 10% of the transients with the long transient duration (0.74 s) to construct the $S_1$ matrix from all pixel locations in order to cover most of the heterogeneous tissue types. Fast decay of the singular values for $S_1$ supports the use of the low-dimensional subspace model (e.g., section 601 in FIG. 6). The selection of L is data adaptive by observing the singular value decays of $S_1$ and the total signal energy retained (usually >97% as the threshold) by keeping the singular vectors associated with the dominant singular values. For the results presented below, the number of basis transients may be chosen as L=250 based on the procedure described above, which was specific to the dataset to minimize truncation or modeling errors. The remaining 90% of the transients were truncated to only 5% of the original duration (0.037 s) to produce $S_2$. The subspace model may be applied to estimate the coefficients $\{c_l(r_k)\}$ using the predetermined basis from $S_1$ and the substantially truncated transients in $S_2$. The estimated coefficients and the basis were used to reconstruct transients to the original duration (0.74 s) to achieve the desired spectral resolution.

The quality of the reconstruction may be evaluated by quantitatively comparing the original spectra and the reconstructed spectra using the described method. First, fast Fourier transform (FFT) and mass calibration were performed to convert both transients from the time domain to the m/z domain. Next, a peak detection algorithm was applied to generate peak lists for both sets of spectra. Pairwise comparison of the generated peak lists was carried out using three metrics: the percentage of m/z features that were correctly recovered, the peak intensity Pearson correlation, and the average relative peak error. Given a set of m/z features $P_i=\{p_1, p_2 \ldots p_a\}$ for an original spectrum i, and another set of m/z features $Q_i=\{q_1, q_2 \ldots q_b\}$ for the corresponding reconstructed spectrum, the percentage of peaks recovered is calculated as:

$$PQ_{i,shared} = \frac{|P_i \cap Q_i|}{|P_i|} \quad \text{(Eq. 5)}$$

which is between 0 and 1. If all m/z features in the original peak list $P_i$ are contained in $Q_i$, $PQ_{i,shared}$ equals to 1. Otherwise, if none of the features in $P_i$ are contained in $Q_i$, it equals to 0. Peak intensity Pearson correlation measures how well the reconstructed peak intensities correlate linearly with the original peak intensities for the shared peaks. The average relative peak error was defined as the mean of the relative peak intensity errors for the shared peaks within a spectrum.

The consistency between ion image pairs may be examined. Peak lists were first aligned nonuniformly to combine them into a multivariate matrix, with each row as a spectrum and each column as an m/z feature. Pearson correlation was used to measure the fidelity of the reconstructed ion images to the original ion images. The ion image sets were also subjected to principal component analysis (PCA) and k-means clustering to further evaluate the model's capability of accurately recovering chemical information through the reconstruction. The scores and coefficients for the first three principal components (PCs) that retained most of the data variance were compared, and hyperspectral visualizations were made through translating the scores of the low-dimensional projections to RGB color coding. For k-means, k=6 was selected to group pixels with similar spectral profiles together in an unsupervised manner. The segmentation masks were visually inspected to determine if groupings based on tissue chemical profiles were similar between the original and the reconstructed ion image data.

Figure 6:
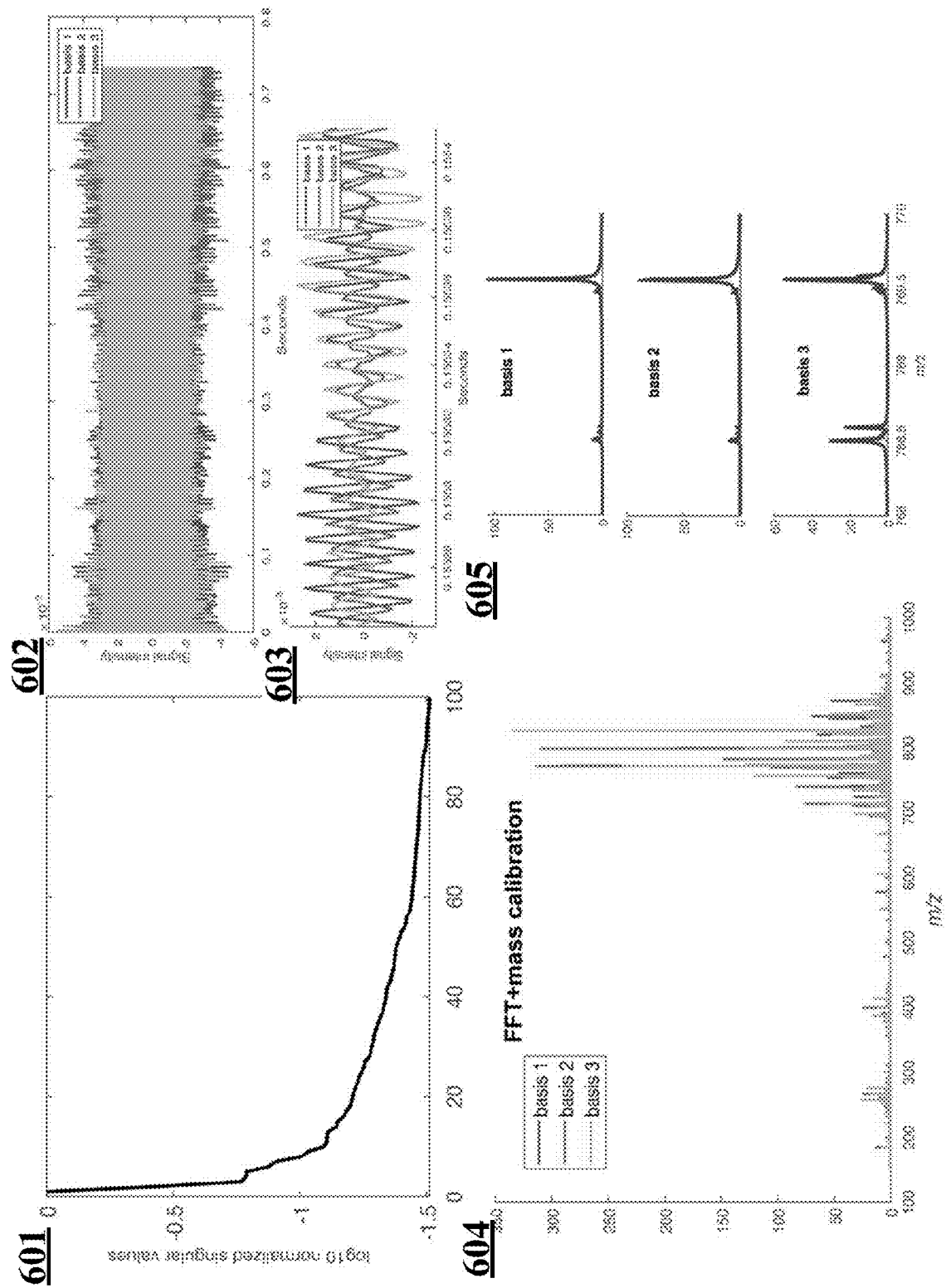
FIG. 6 shows data randomly sampled from a rat brain imaging dataset for an exemplary embodiment.

FIG. 6 shows that SVD is performed on 4000 transients randomly sampled from the rat brain imaging dataset. Section 601 shows that the rapid decay of the sorted singular values is approaching a <3% truncation error for models with an order >80, capturing most of the energy within the sampled signals. Section 602 shows that only the first three basis transients were visualized, and section 603 shows that distinct frequency compositions were found within a short time window, indicated by the black arrow. Section 604 shows that the basis transients were converted to the m/z domain, where section 605 shows that distinct spectral features were present from m/z 768 to m/z 770 in the first three basis spectra.

Results Of Various Exemplary Embodiments

The description of the present disclosure turns to a topic of low-rank properties of experimental transient signals. For data that are low rank, a lower-dimensional subspace exists compared to the original data. Various applications, such as data compression, signal reconstruction, and/or signal denoising, may exploit the low-rank properties of the data, providing more efficient ways for data manipulation and data acquisition. The FT-ICR temporal signals may be measured from the tissue slice to be low rank. In other words, their transient data may be projected onto a lower-dimensional subspace with a minimal loss of fidelity. As shown in section 601 in FIG. 6, the Casorati matrix formed by the S1 data with 4000 randomly sampled long transients measured from the sagittal brain slice may have rapidly decaying singular values, indicating that these transients reside in a low-dimensional subspace. These rapidly decaying singular values support an assumption that the transients may be accurately approximated by the obtained subspace, with a model order (number of basis vectors) determined by thresholding the normalized singular values. By visualizing the first few basis transients, varying signal signatures with distinct frequency components may be found/identified (e.g., section 602 and/or section 603 in FIG. 6). The basis transients were then converted to the m/z domain through FFT and mass conversion/calibration (e.g., section 604 in FIG. 6) to visualize the basis spectra. the presence of different spectral features in those basis spectra may be due to the finite heterogeneity of the measured data (e.g., section 605 in FIG. 6). Since many tissue subregions with distinct chemical profiles were covered in a sagittal brain slice, SVD essentially preserved the biological variations and transformed them into an orthonormal basis. Interestingly, by projecting transient data onto a lower-dimensional space through rank truncation, background noise can be efficiently removed, leading to the denoising effect once back-projected onto the original data space. This denoising effect can be observed in the top-ranked basis transients corresponding to larger singular values (high-energy components) versus the ones corresponding to smaller singular values (low-energy components), as the top basis transients give rise to nearly noiseless signals and the later basis transients are more contaminated by noise. Based on the degree of homogeneity of the measured data, such that pixels from the same tissue type likely have similar chemical contents, a subset of transient data can be used to approximate the basis without using all of the data points. A similar concept was applied to compressing large MSI datasets over the spectrum in the m/z domain rather than in the temporal domain. The choice of the number of long transients to be sampled affects the representativeness of the extracted basis transients. Long transients need to span the entire subspace for accurate subspace estimation and the more samples that are available to SVD results in a better subspace approximation. Theoretically, the lower bound may be equal to the rank, i.e., the subspace model order L. For the test data, the 4000 long transients were sufficient to cover the tissue heterogeneity present through the sagittal slice; beyond 4000 long transients, the subspace estimation improvement is minimal. The number of long transients can be further optimized for different applications, which results in a tradeoff between long transient acquisition time and subspace estimation accuracy.

Typically, computing the transformation needed to represent the transient data in a subspace requires storing them onto the computer's memory. As the number of the sampled transients increases, using SVD to determine the basis transients becomes computationally expensive. Since a small subset of transients was used to obtain the basis, this group may be fit into a memory with a relatively small size, for example, a 64 Gb RAM. For experiments with more data points per transient, one may need to consider decreasing the number of sampled transients, depending on the amount of memory available. Workarounds may be available to compute the basis more efficiently.

The description of the present disclosure turns to a topic of accurate estimation of experimental transients using the predefined subspace. The results from performing SVD on sampled transients demonstrate that a lower-dimensional subspace for the data may be found. As stated previously, the actual measurements are somewhat homogeneous with the addition of random noise due to the similar chemical profiles of pixels from the similar tissue types. With such redundancy, it may not be necessary to acquire all transients at the same transient length. To validate the subspace approach, 4000 transients may be randomly sampled to obtain the basis for the brain imaging dataset and the remaining 35,775 transients may be truncated to keep only the first 5% of the signals. Least squares may be applied to find the best fit between each truncated transient and the top basis transients at L=250 using the same truncated length. The fitted coefficients were subsequently used as weights to linearly combine the full-length basis transients and generate the reconstructed temporal signals with the desired spectral resolution for all pixels. As the total data acquisition time for an FT-ICR MSI experiment is limited by the transient length and the total number of pixels scanned, a strategy was to reduce the total data acquisition time by approximately 85% (~8 h down to ~1 h). To better demonstrate the unique capability of the method, a situation may be simulated in which all transients were uniformly truncated to achieve the same reduced acquisition time (0.11 s per transient) without using the method for comparison.

Figure 7:
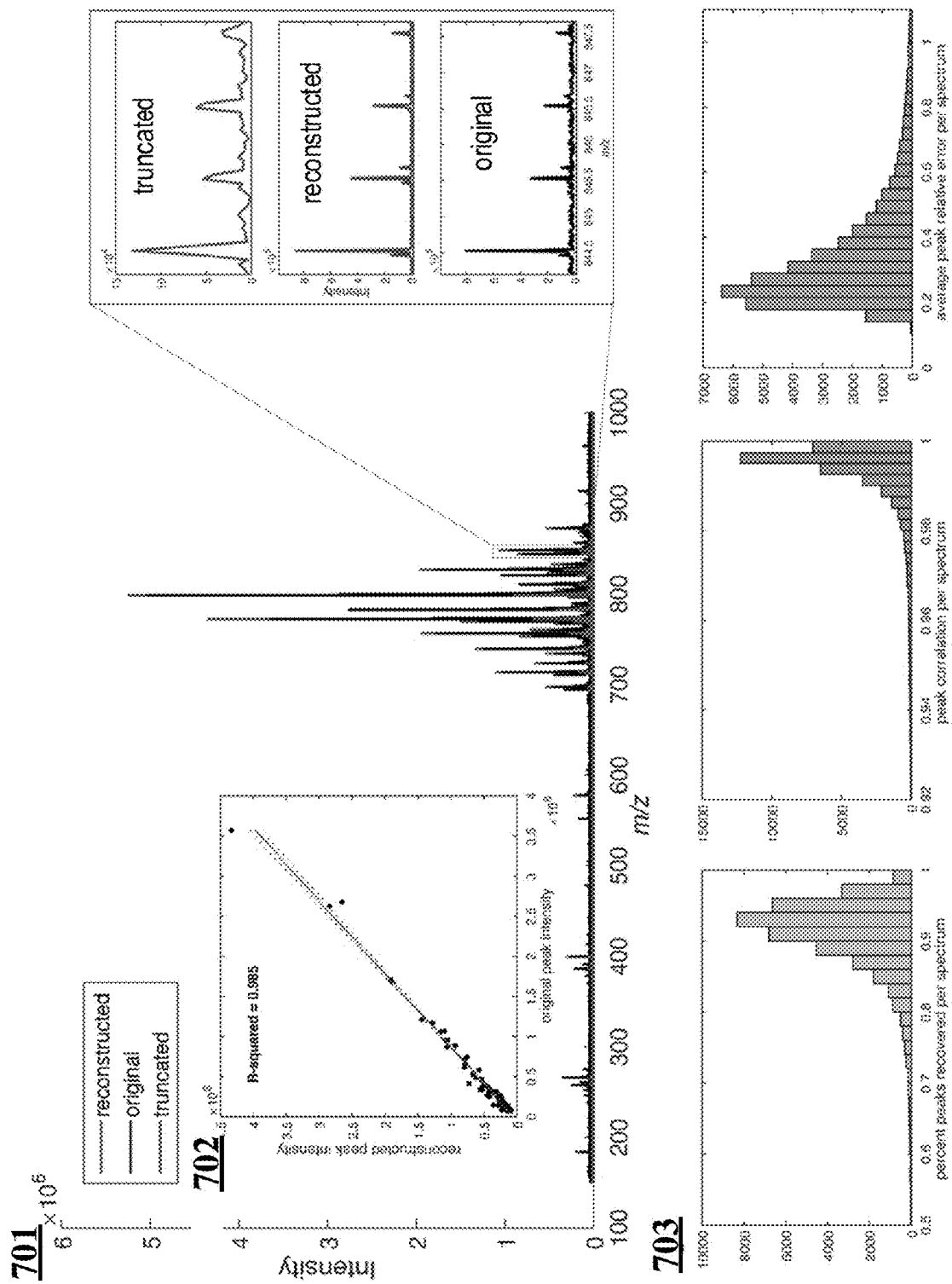
FIG. 7 shows a comparison result for an exemplary embodiment.

FIG. 7 shows a comparison result. Section 701 shows spectra for the original (black), reconstructed (red), and truncated (blue) transients. The inset shows the spectra from m/z 844 to m/z 848. The reconstructed spectrum displays high fidelity to the original spectrum with a high SNR and peak features effectively recovered, whereas the spectrum from the truncated, short transient has a much lower spectral resolution that obscures spectral details and lowers mass accuracy. Peak detection was performed for the original and the reconstructed spectrum. Section 702 shows that reconstructed peak intensities correlate with the original intensities. Section 703 shows the distributions of percent peak features recovered, peak intensity correlation, and the average relative peak error for the reconstructed spectra in the brain imaging dataset.

The reconstructed and truncated transients were converted to the m/z domain through FFT and mass calibration, allowing spectrum-wise evaluations against the original data. The reconstructed mass spectra showed high fidelity compared to the original spectra (from the long acquisition, e.g., section 701 in FIG. 7), with detailed peak features well recovered and an improved SNR, whereas the spectra from purely truncated transients displayed a much degraded mass resolution caused by shorter transients. The reconstruction quality may be quantified by comparing peak features. Specifically, peak detection may be performed on the reconstructed and original spectrum pairs to test how effective the reconstruction was at recovering peak features, which was evaluated by three metrics: the percentage of peaks that were correctly recovered, the Pearson correlation coefficients, and the average relative peak error. The mutual peaks between the original spectrum and the reconstructed spectrum are linearly correlated (e.g., section 702 in FIG. 7), showing accurate estimations of peak intensity across each whole spectrum. Performing the above evaluations on the entire sagittal brain dataset demonstrated that >90% of peak features are recovered correctly (section 703, left, in FIG. 7) while achieving high correlation values for intensities of the shared peaks (section 703, middle, in FIG. 7). The average relative peak error is <25% for most spectra (section 703, right, in FIG. 7), with the main errors likely due to the least-squares fitting favoring high-intensity peaks. This error should be tolerable as the relative intensities within a spectrum are consistent, shown by high Pearson correlation values. Significant improvement was achieved, which can be visualized by contrasting the distribution of the percent peak features recovered in uniformly truncated transients. In some implementations, a limited number of features may be correctly matched, even though the m/z values were rounded to two decimal places. In addition, fewer peak features were detected in the truncated transients due to loss of spectral resolution, whereas more peak features were detected in the reconstructed transients using the subspace model.

In some implementations, the model order L may be empirically chosen to minimize the truncation errors by inspecting the singular value decay of the Casorati matrix formed by the long transients. To further investigate the effects of L, reconstructions of the same data may be performed with different Ls. In some implementations, fitting with a very low order may likely produce accurate reconstruction of the dominant spectral features (signals with higher energy) but also may introduce structured errors in the results. As finer features and instrumental noise are predominantly captured by the higher order basis, reconstruction using too high an order may result in an increase in spectral noise. It is also worth emphasizing that the resolution of the reconstructed spectra is entirely determined by the basis transients. The basis transients are equivalent to that of the sampled long transients (a unique feature of the subspace-based fitting), regardless of the persistency of the transient signals as long as the subspace captures the majority of the spectral features to be recovered.

The description of the present disclosure turns to a topic of evaluation of ion images. An ion image is a visual representation of the localization and distribution of specific molecular species. The peak lists, or m/z and peak intensity pairs, obtained from peak detection are aligned with a predefined mass tolerance to generate a multivariate intensity matrix, with columns and rows representing m/z features and pixel locations, respectively. Each column vector of an intensity matrix can then be mapped to a two-dimensional ion image, forming hyperspectral image data. For this study, the peak lists from the original spectra and reconstructed spectra were aligned to generate intensity matrices, and 480 ion images were formed for qualitative and quantitative comparison. Pearson correlation coefficients between the original and reconstructed image pairs of the same m/z feature were calculated. Higher correlation values indicate more faithful spatial reconstruction results when compared to the ion images generated by the original long acquisition.

Figure 8A:
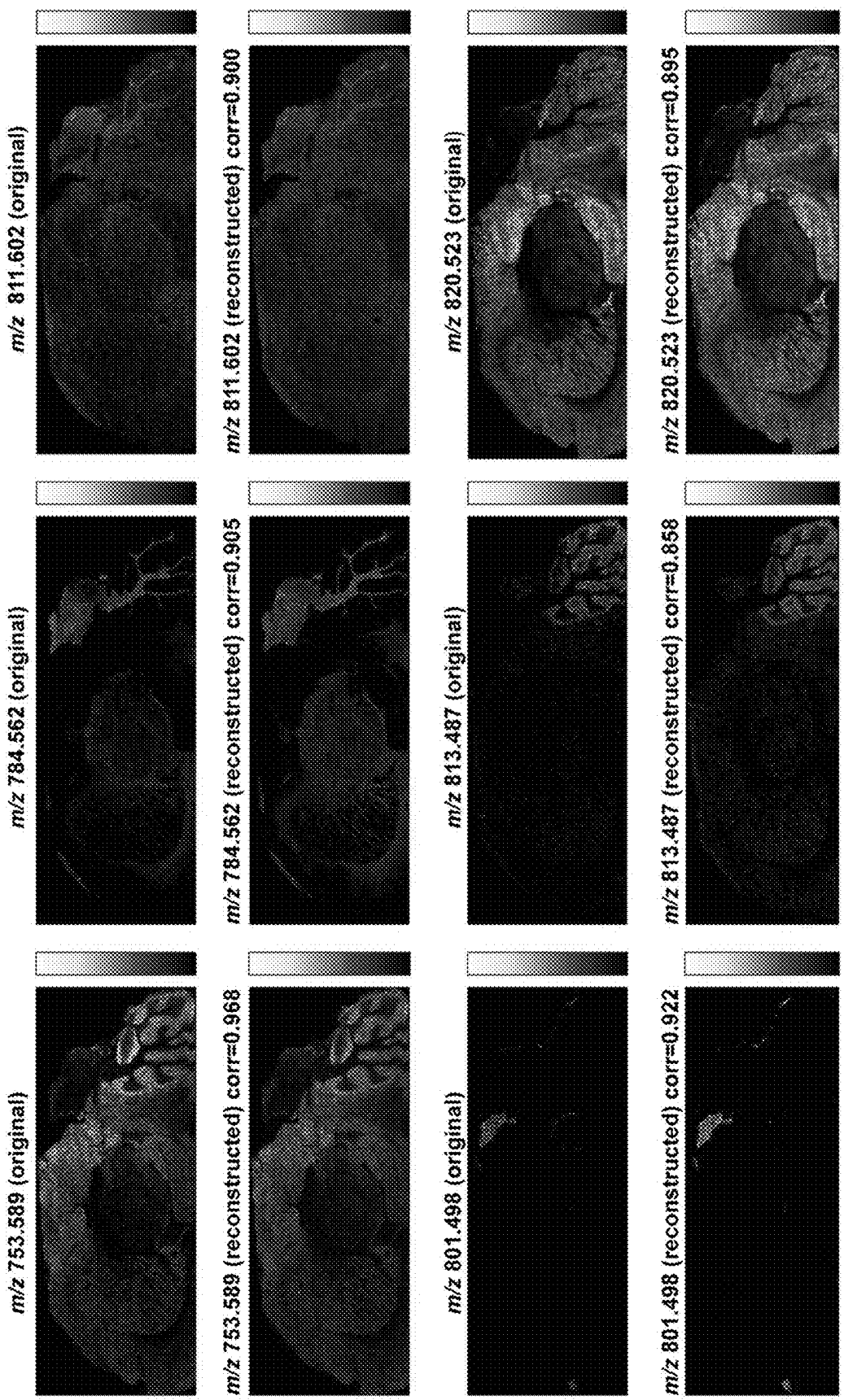
FIG. 8A shows a portion of pairwise comparison between original and reconstructed ion images for a brain imaging dataset for an exemplary embodiment.
Figure 8B:
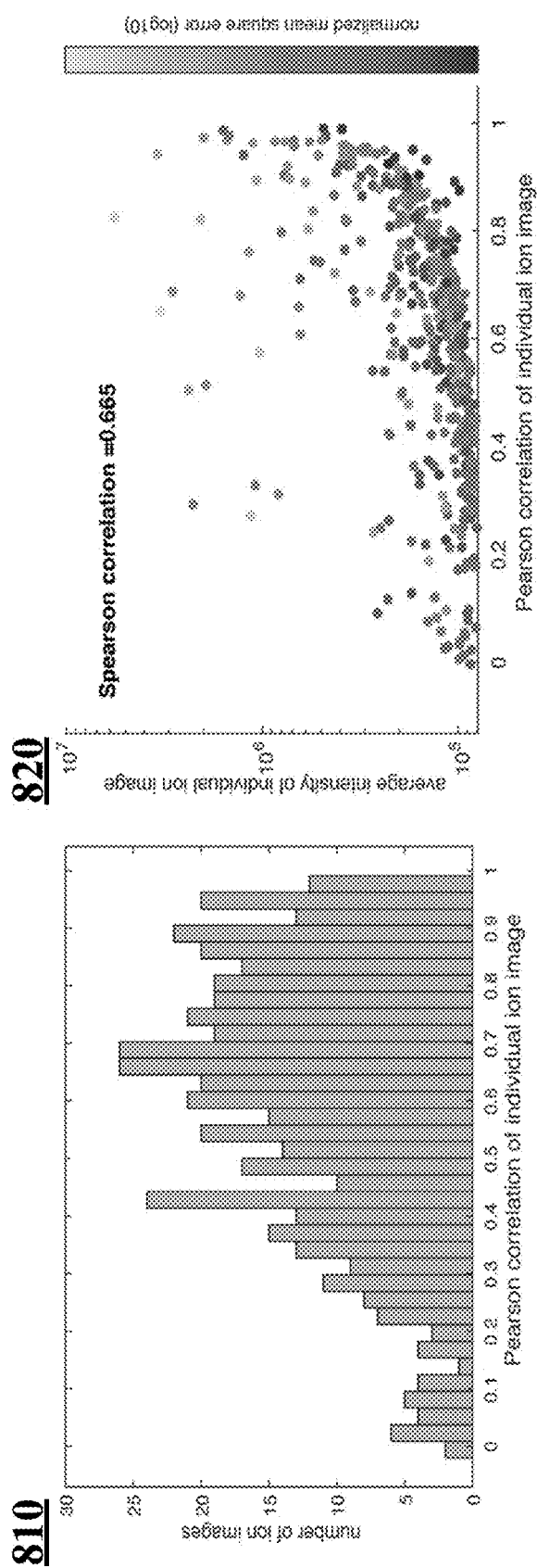
FIG. 8B shows another portion of pairwise comparison between original and reconstructed ion images for a brain imaging dataset for an exemplary embodiment.

FIGS. 8A and 8B show pairwise comparison between the original and reconstructed ion images for the brain imaging dataset. FIG. 8A shows ion image pairs, the original image (top) and the reconstructed image (bottom), for selected m/z values. Section 810 in FIG. 8B shows the distribution of Pearson correlation coefficients for 480 ion images. Section 820 in FIG. 8B shows a plot of the average intensity of the ion image versus the Pearson correlation demonstrates that ion images with lower average signal intensities tend to have lower coefficients for reconstruction. Color bar represents the normalized mean square error.

The distribution of the correlation values of the ion images for the brain imaging dataset (e.g., section 810 in FIG. 8B) shows that the reconstructed ion images from m/z 150-1000 have a median 0.64 Pearson correlation. Almost identical ion images were reconstructed from peaks with strong signal intensities using the described method (m/z 753.589, m/z 820.523, e.g., FIG. 8A), which correspond to lipids that are enriched in specific brain regions. Not surprisingly, ion image pairs with lower average intensities had lower correlation values compared to the ones with higher average intensities (e.g., section 820 in FIG. 8B). The information from small peaks was less dominant in the predefined subspace to estimate the transients. For example, the ion image at m/z 688.394 shows poor reconstruction (Pearson=0.0551); in the original image, this appears to be chemical noise without a spatial colocalization. Interestingly, in some cases the method yielded improved ion image visualization with higher image contrast and more defined spatial features compared to the original images (m/z 784.562, m/z 785.567, m/z 811.602 in FIG. 8A; and m/z 772.559, m/z 825.557, m/z 828.548 in FIG. 16). Enhanced ion image visualization can be attributed to the denoising ability of the subspace model due to the dimensionality reduction. Similar fittings (coefficients) that were obtained from nearby tissue locations with closely related chemical profiles led to a smoothing effect.

Figure 9A:
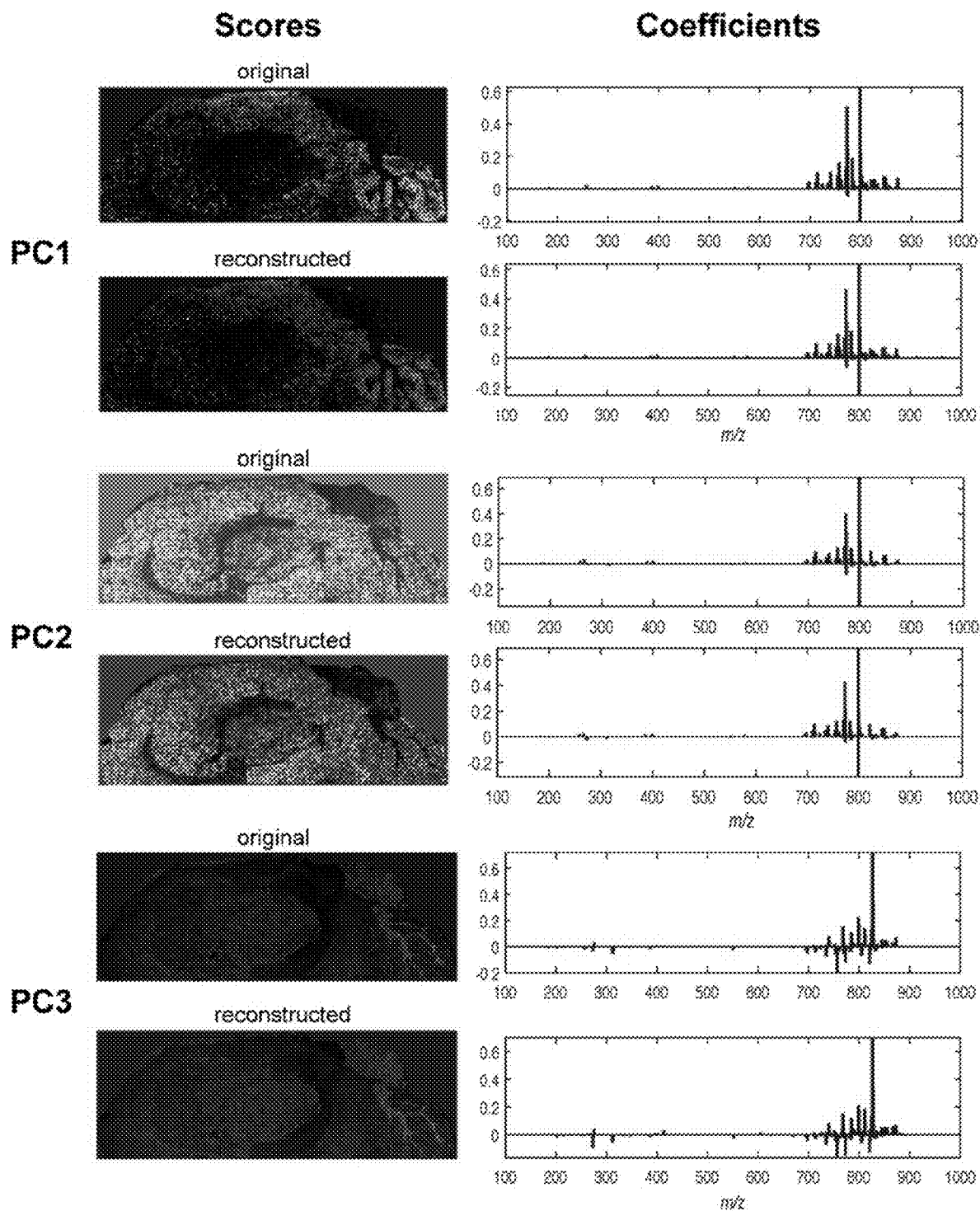
FIG. 9A shows a portion of principal component analysis (PCA) results from original data and reconstructed data in an exemplary embodiment.

FIGS. 9A and 9B show PCA results from the original data and the reconstructed data using the method. FIG. 9A shows that nearly identical scores and coefficients were obtained for the first three PCs (~90% explained variance). FIG. 9B shows that hyperspectral visualizations by translating PC scores to RGB channels also produced similar results. The reconstructed data retained the variation for most of the chemical information, and the total acquisition time needed was only 15% of the original acquisition time.

To further evaluate the capability of the method to preserve important chemical information for subsequent tissue sample analysis and data mining, PCA may be applied on the original data, which is compared it against the reconstructed data using a total of 480 images. Unsupervised, multivariate analysis, such as PCA and k-means clustering, play irreplaceable roles in exploring and interpreting high-dimensional hyperspectral MSI data. Evaluation of the first three PCs (e.g., FIG. 9A) resulted in similar scores and coefficients, indicating that the majority of the variance (90% variance explained by first three PCs) was accurately captured by the method while still reducing the data acquisition time by 85%. Similar hyperspectral visualizations were achieved by color coding the scores of the first three PCs (e.g., FIG. 9B). K-means clustering was used to further demonstrate that the method may adequately recover chemical information to perform unbiased spatial segmentation. By grouping similar spectra together, physical interpretations about tissue organization based on the spectral features can be obtained in a much shorter experimental time frame.

More Details in Various Exemplary Embodiments

The description of the present disclosure turns to a topic of experimental details for MSI preparation. Ten- to 12-week old male Sprague-Dawley® outbred rats, for example, from Rattus norvegicus, were obtained. Animal euthanasia was performed in accordance with the Illinois Institutional Animal Care and Use Committee and both federal and ARRIVE guidelines for the humane care and treatment of animals. Sagittal brain slices were prepared from the right hemisphere of the rats. Following decapitation, the entire rat brain was rapidly excised and flash-frozen before tissue sectioning. Sagittal brain slices were prepared at −20° C. and sectioned to generate 16-µm-thick tissue slices. The tissue slices were thaw-mounted onto indium-tin oxide glass slides for matrix application. The MALDI matrix 2,5-dihydroxybenzoic acid (DHB) was prepared to a concentration of 30 mg/mL in 70% methanol. Matrix was applied using an HTX-M5 Sprayer, for example, from HTX Technologies, with a spray spacing of 2.5 mm at a temperature of 75° C. using a flow rate of 100 µL/min. The distance of the sprayer nozzle was 50 mm from the sample and a spray pressure of 10 psi with a spray velocity of 1200 mm/min was used.

The description of the present disclosure turns to a topic of computational details for the subspace model.

Regarding discretized matrix representation of MSI data, based on the subspace model, the transient of interest $s(r_n, t)$ at pixel $r_n$ can be expressed as a linear combination of the basis transients $\{\phi_l(t)\}_{l=1}^{L}$ weighted by corresponding coefficients $\{c_l(r_n)\}_{l=1}^{L}$. During an FT-ICR experiment, each transient $s(r_n, t)$ is sampled with a specific temporal sampling rate, leading to a discrete signal specified at a set of temporal indices $t=\{t_1, t_2, \ldots t_{N_T}\}$ where $N_T$ is the number of discrete time points for a transient length T. Given a set of sampled transients $\{s(r_n, t_i)\}_{n,i=1}^{N,N_T}$, they can be arranged into a Casorati matrix as follows:

$$S = \begin{bmatrix} s(r_1, t_1) & \cdots & s(r_1, t_{N_T}) \\ \vdots & \ddots & \vdots \\ s(r_N, t_1) & \cdots & s(r_N, t_{N_T}) \end{bmatrix}$$

with rows being individual transients from different pixels and columns as the time points. This formulation of the temporal signals allows applying computation techniques such as matrix factorization to explore the inherent low dimensionality of the given data. More specifically, the subspace model may imply that S is low rank, i.e., rank(S) ≤L, and can be factorized as S=CΦ, where C and Φ are matrix representations of the spatial-dependent coefficients and the basis transients. Since both C and Φ are low rank, the total number of degrees-of-freedom (or unknowns) in them are dramatically smaller than S, making reconstruction from fewer samples possible.

Regarding singular value decomposition (SVD), SVD may be applied on the Casorati matrix $S_1$ to obtain the basis transients Φ. In SVD, a real or complex matrix is factorized into three matrices through eigen decomposition. Specifically, for the compact SVD, given a D×$N_T$ matrix $S_1$ formed by the sampled long transients with the desired spectral resolution, it can be decomposed as $S_1 = U\Sigma V^T$, where U is a D×D matrix, V is an $N_T \times D$ matrix, and $\Sigma$ is a D×D square matrix with non-negative real numbers on the diagonal as singular values. Based on the singular value decay, a model order L can be selected heuristically to achieve a small rank-truncation error. The basis transients can then be expressed as: $\Phi = V_L^T$, where $V_L^T$ is the truncated $V^T$ with only the top L row vectors and the rest discarded.

Figure 10:
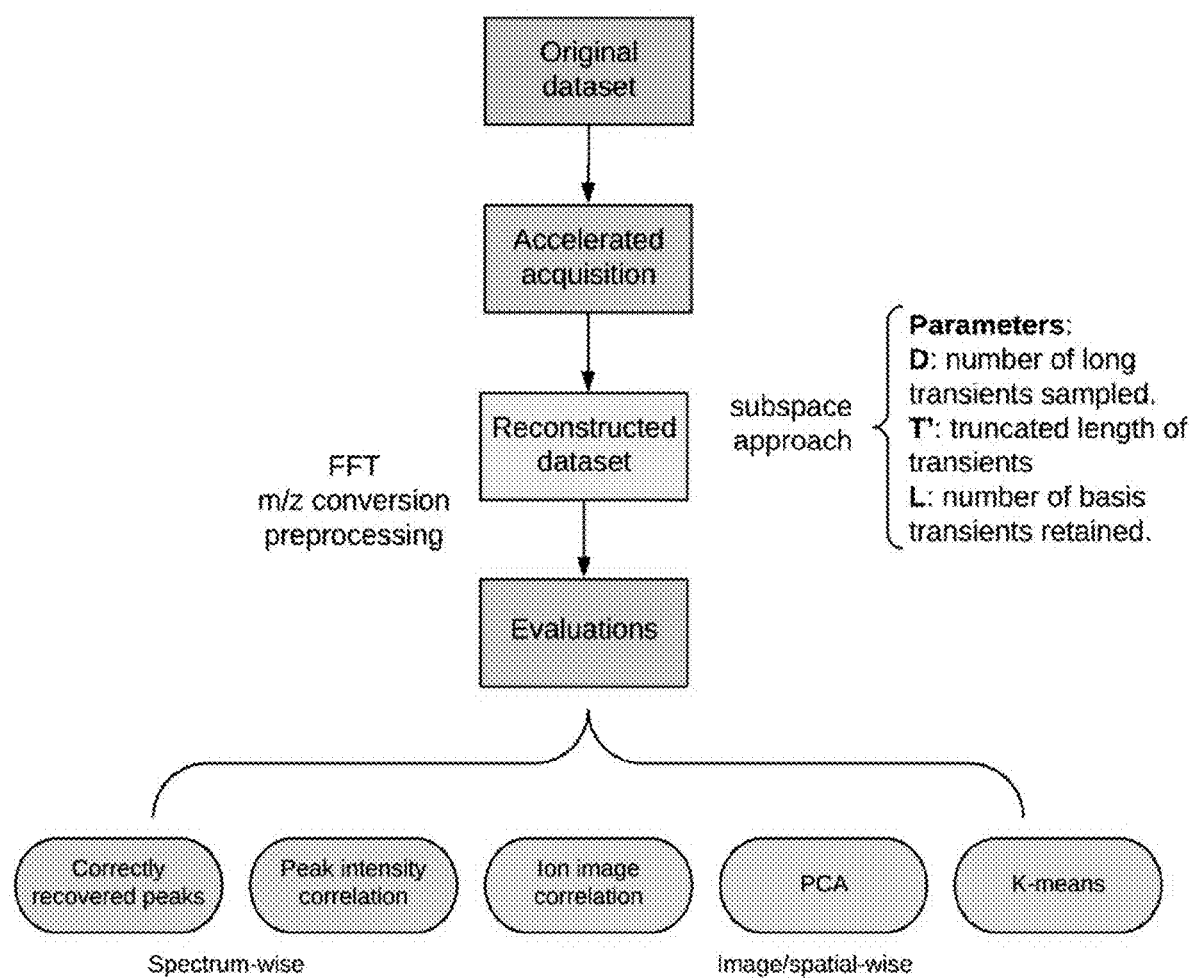
FIG. 10 shows an evaluation pipeline for an exemplary embodiment.

For various embodiments in the present disclosure, FIG. 10 shows a pipeline for evaluating the reconstructed data produced by the subspace approach.

Figure 11:
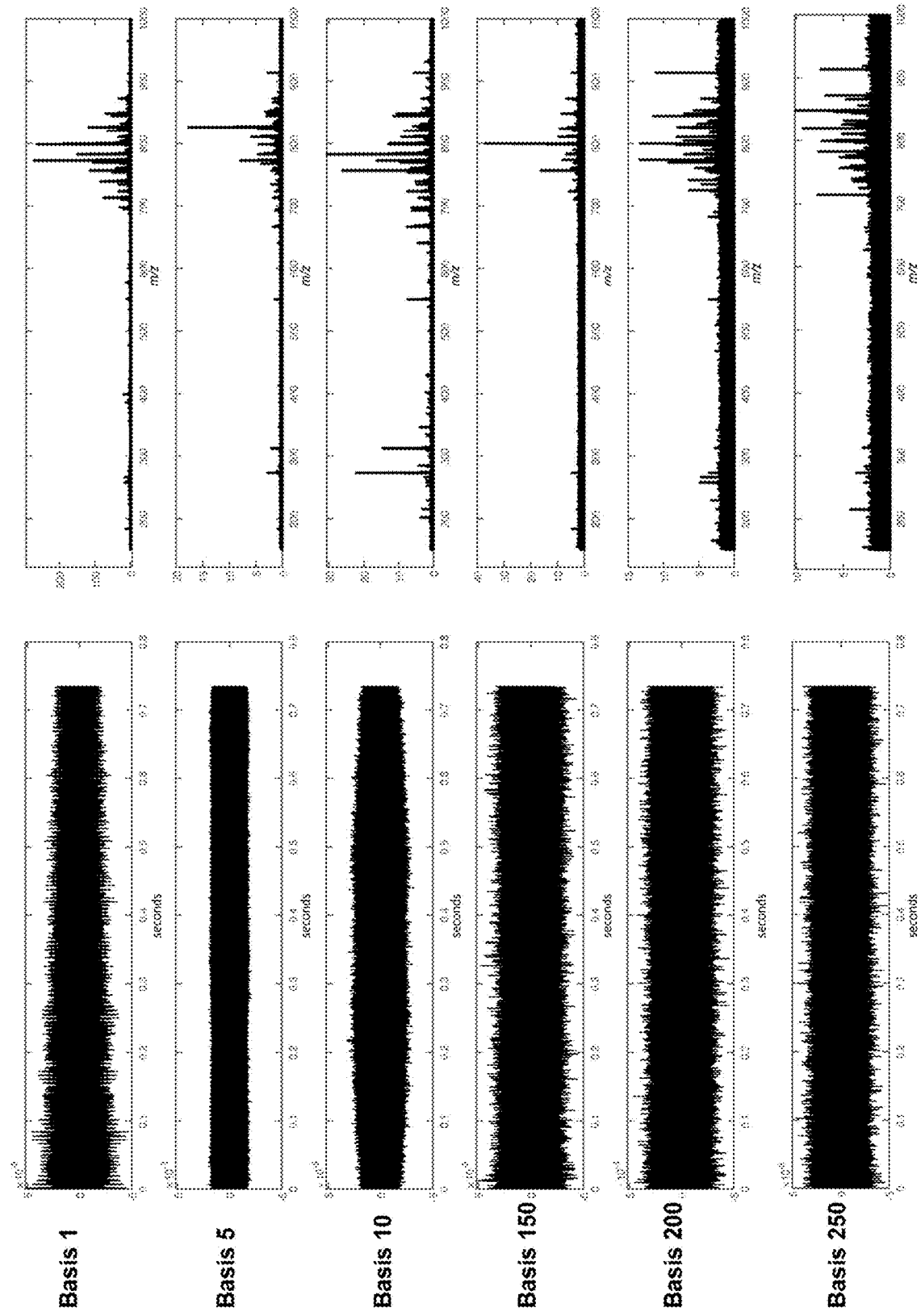
FIG. 11 shows the basis transients from 4000 sampled long transients for an exemplary embodiment.

For various embodiments in the present disclosure, FIG. 11 shows basis transients extracted from 4000 long transients of the brain tissue imaging data. Based on the order of the singular values (descending order), basis number 1, 5, 10, 150, 200, and 250 are shown on the left column, and the corresponding spectra are shown on the right. Top basis numbers 1, 5, and 10, which capture high-energy components, display distinct peak features with low noise levels, whereas basis numbers 150, 200 and 250 are more dominated by noise.

Figure 12:
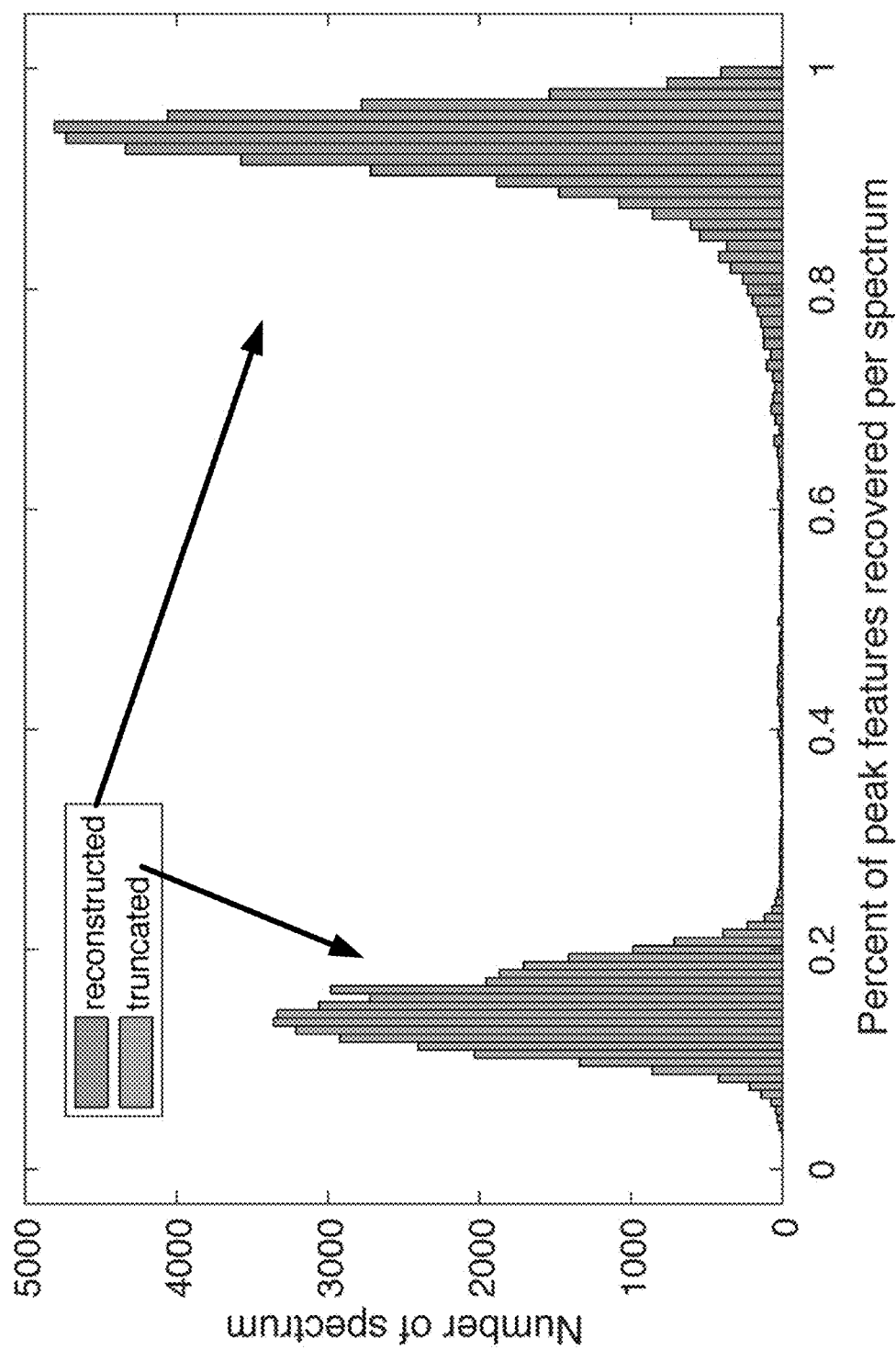
FIG. 12 shows peak features recovered in the truncated transients for an exemplary embodiment.

For various embodiments in the present disclosure, FIG. 12 shows a distribution of percent peak features (SNR>10) correctly identified per spectrum in the uniformly truncated short transients compared to that of the reconstructed transients using the subspace approach for the rat brain imaging data. Both cases resulted in the same data acquisition time. The described method offers significantly better reconstruction than the acceleration strategy using uniformly truncated data, which was only able to recover limited spectral information.

For various embodiments in the present disclosure, FIG. 13 shows spectral reconstruction evaluation. Section 1310 shows boxplots of the number of peak features detected per spectrum with SNR>10 in three sets of data. Section 1320 shows $\log_{10}(SNR)$ of all detected peaks in three sets of data. The increased number of detected peaks in the reconstructed data could be attributed to the improved SNR by the subspace approach.

For various embodiments in the present disclosure, FIG. 14 shows mass spectra reconstructed using different numbers of basis transients. Whole spectra are shown on the left and a zoomed-in view on the right from the original transient (section 1410), reconstructed using 5 basis transients (section 1420), reconstructed using 50 basis transients (section 1430), and reconstructed using 150 basis transients (section 1140). The low-dimensional subspace already leads to accurate reconstruction while effectively reducing the instrumental noise.

For various embodiments in the present disclosure, FIG. 15 shows distribution of the Pearson correlation between ion images. Section 1510 shows a three-dimensional (3D) histogram of the distributions of Pearson correlation for the m/z features. Section 1520 shows a two-dimensional (2D) view of the histogram. Section 1530 shows a mapped percentage of peak feature recovered scores for each pixel location. The percentage scores are slightly lower at certain tissue locations (types), but reach>0.9 for almost the entire tissue coverage.

Figure 16A:
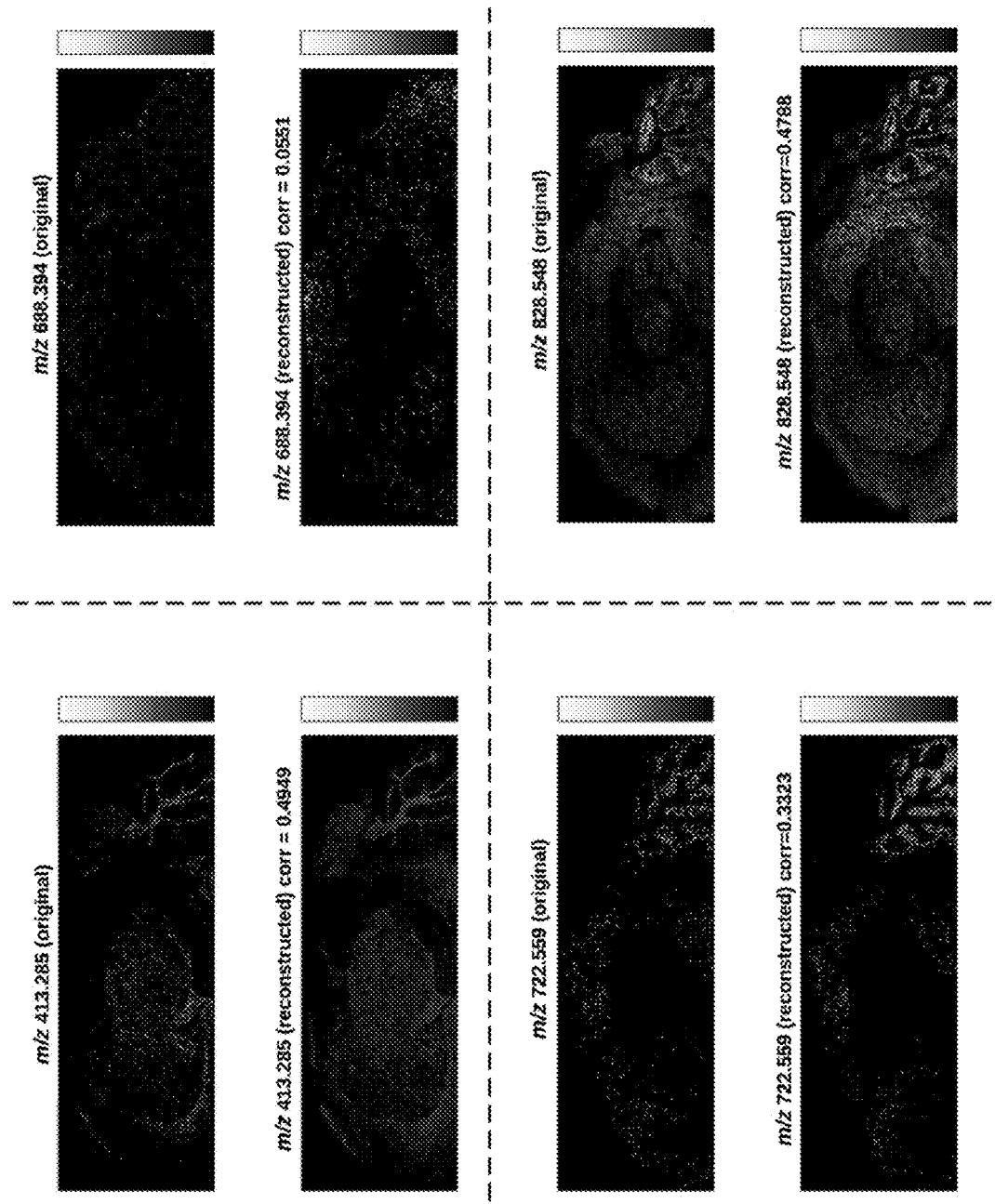
FIG. 16A shows a portion of visualizations of ion images with low correlations for an exemplary embodiment.
Figure 16B:
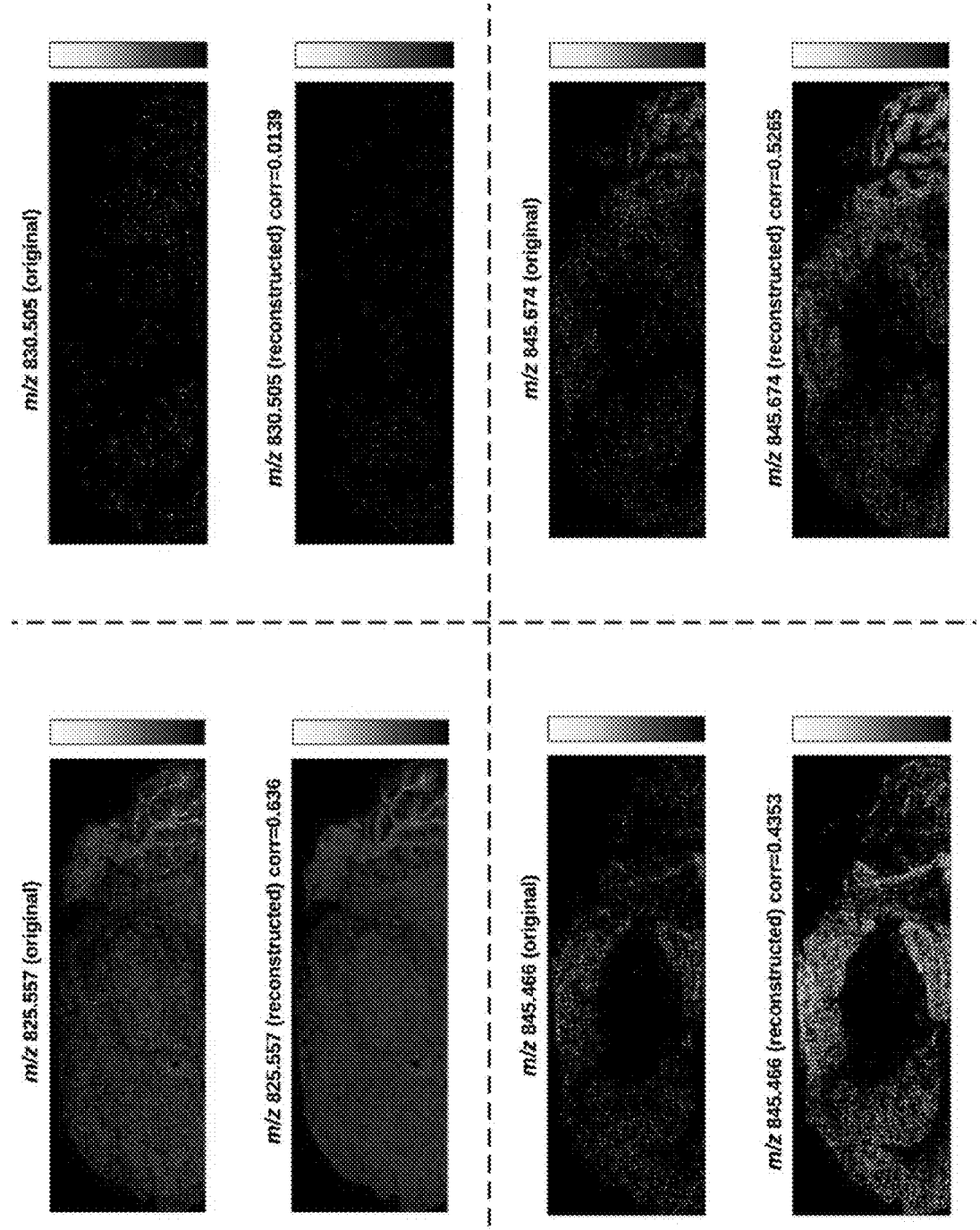
FIG. 16B shows another portion of visualizations of ion images with low correlations for an exemplary embodiment.

For various embodiments in the present disclosure, FIGS. 16A and 16B show visualizations of some ion images with lower Pearson correlations (<median). Despite the noise (m/z 688.394, m/z 830.505), which generates images with low correlation scores, other reconstructed ion images such as m/z 413.285 (Pearson=0.4949), m/z 772.559 (Pearson=0.3323) and m/z 828.548 (Pearson=0.4788) provides higher contrast to the background and structural features compared to their originals. This may be due to the denoising effects of the subspace model-based fitting.

For various embodiments in the present disclosure, FIG. 17 shows PCA scores for the top three PCs color coded by their coordinates in the PC space.

Figure 18:
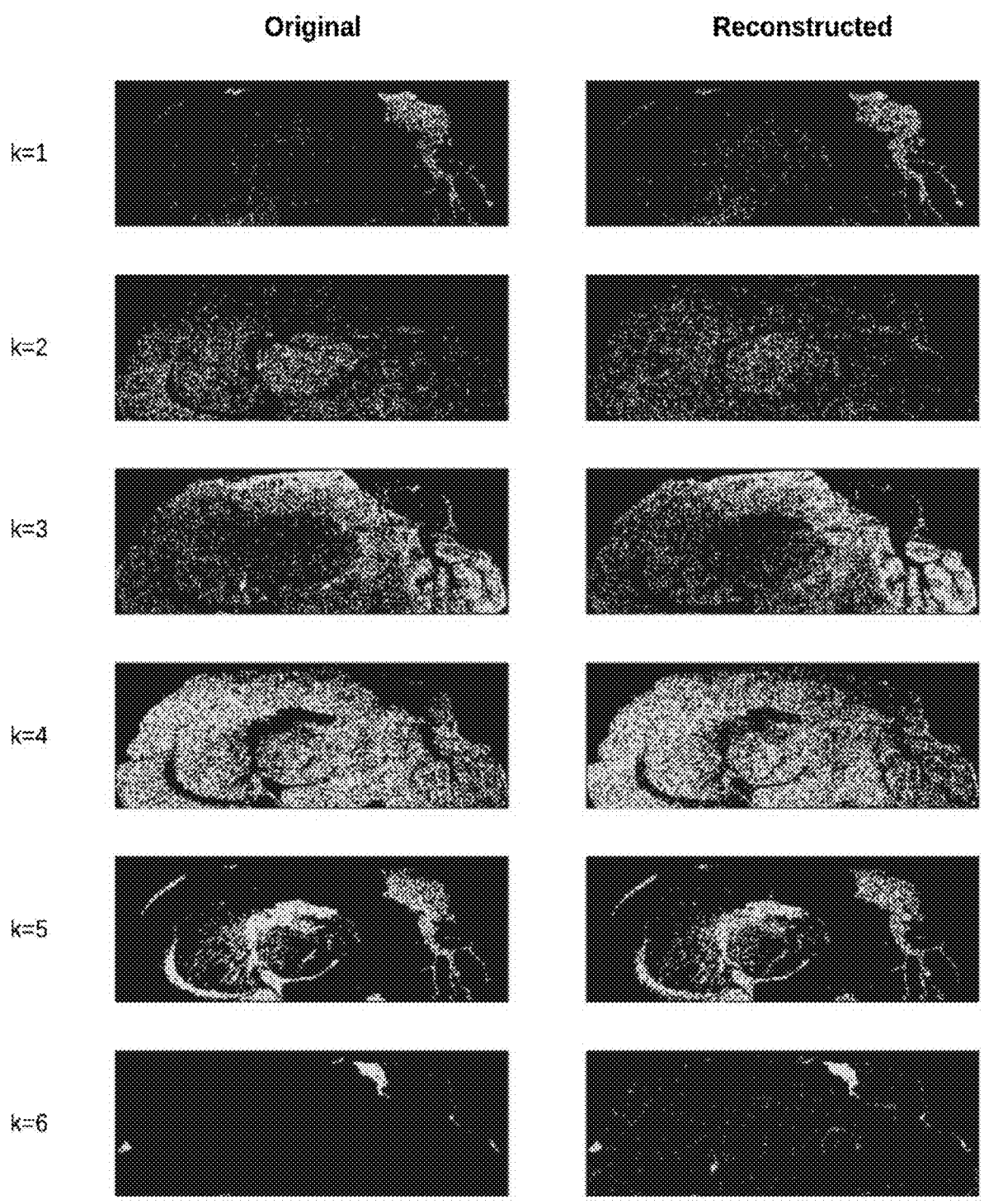
FIG. 18 shows k-means segmentation masks for an exemplary embodiment.

For various embodiments in the present disclosure, FIG. 18 shows binary segmentation masks obtained from k-means.

The present disclosure describes various embodiment utilizing a subspace approach for the acquisition and computational reconstruction of FT-ICR-based MSI data. The methods described in the present disclosure allows for significantly faster imaging experiments without compromising mass or spatial resolution while obtaining exceptionally similar chemical information, validated using a high-resolution rat sagittal brain imaging dataset. In addition, the approach does not require customized systems and may be implemented with commonly available computational resources. One or more methods described in the present disclosure may be extended to three-dimensional MSI, which is time consuming due to the imaging of multiple tissue slices at high spatial resolutions. The approach may be readily combined with alternative computational imaging modalities (e.g., CS), and generalized to other FT-based instruments such as Orbitrap MS platforms that also acquire data as time-domain transients.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A method for obtaining high-resolution mass spectra and chemical maps from a sample using a subspace Fourier transform (FT) mass spectrometry (FT-MS) approach, the method comprising:
   conducting, by a device comprising a memory storing instructions and a processor in communication with the memory, a data collection process that generates nonuniform lengths of FT-MS data across different spatial locations on a sample, the FT-MS data comprising a first set of image data corresponding to a first group of spatial positions on the sample and a second set of image data corresponding to a second group of spatial positions on the sample;
   conducting, by the device, a decomposition process on the first set of image data to obtain a set of basis elements for the sample;
   performing, by the device, a reconstruction process on a second set of image data based on the set of basis elements to obtain a set of reconstructed image data;
   performing, by the device, a first Fourier transform on the first set of image data to obtain a first set of mass spectra, the first set of mass spectra corresponding to the first group of spatial positions on the sample;
   performing, by the device, a second Fourier transform on the set of reconstructed image data to obtain a second set of mass spectra, the second set of mass spectra corresponding to the second group of spatial positions on the sample; and
   obtaining, by the device, a FT-MS image for the sample based on the first set of mass spectra and the second set of mass spectra.

2. The method according to claim 1, wherein:
   the first set of image data corresponds to data with a first transient duration;
   the second set of image data corresponds to data with a second transient duration; and
   the second transient duration is shorter than the first transient duration.

3. The method according to claim 1, wherein:
   the first set of image data corresponds to a FT MS image with a first mass resolution;
   the second set of image data corresponds to a FT MS image with a second mass resolution; and
   the first mass resolution is finer than the second mass resolution.

4. The method according to claim 1, wherein:
   the first group of spatial positions comprises a first number of spatial positions;
   the second group of spatial positions comprises a second number of spatial positions; and
   the first number is smaller than the second number.

5. The method according to claim 1, wherein:
   the first group of spatial positions is randomly selected on the sample.

6. The method according to claim 1, wherein:
   the decomposition process comprises a singlular value decomposition or other types of matrix decomposition methods.

7. The method according to claim 1, wherein:
   the reconstruction process corresponding to the second set of mass spectra is performed in one of a location-by-location fashion or jointly for all the second group of spatial positions simultaneously.

8. The method according to claim 1, wherein:
   the FT MS image comprises at least one of the following:
   a Fourier transform ion cyclotron resonance (FT-ICR) mass spectrometry image; or
   a Fourier transform Orbitrap mass spectrometry image.

9. An apparatus for obtaining high-resolution mass spectra and chemical maps from a sample using a subspace Fourier transform (FT) mass spectrometry (FT-MS) approach, the apparatus comprising:
   a memory storing instructions; and
   a processor in communication with the memory, wherein, when the processor executes the instructions, the processor is configured to cause the apparatus to perform:
      conducting a data collection process that generates nonuniform lengths of FT-MS data across different spatial locations on a sample, the FT-MS data comprising a first set of image data corresponding to a first group of spatial positions on the sample and a second set of image data corresponding to a second group of spatial positions on the sample,
      conducting a decomposition process on the first set of image data to obtain a set of basis elements for the sample,
      performing a reconstruction process on a second set of image data based on the set of basis elements to obtain a set of reconstructed image data,
      performing a first Fourier transform on the first set of image data to obtain a first set of mass spectra, the first set of mass spectra corresponding to the first group of spatial positions on the sample,
      performing a second Fourier transform on the set of reconstructed image data to obtain a second set of mass spectra, the second set of mass spectra corresponding to the second group of spatial positions on the sample, and
      obtaining a FT-MS image for the sample based on the first set of mass spectra and the second set of mass spectra.

10. The apparatus according to claim 9, wherein:
    the first set of image data corresponds to data with a first transient duration;

the second set of image data corresponds to data with a second transient duration; and the second transient duration is shorter than the first transient duration.

11. The apparatus according to claim 9, wherein:

the first set of image data corresponds to a FT MS image with a first mass resolution;

the second set of image data corresponds to a FT MS image with a second mass resolution; and the first mass resolution is finer than the second mass resolution.

12. The apparatus according to claim 9, wherein:

the first group of spatial positions comprises a first number of spatial positions;

the second group of spatial positions comprises a second number of spatial positions; and the first number is smaller than the second number.

13. The apparatus according to claim 9, wherein:

the first group of spatial positions is randomly selected on the sample.

14. The apparatus according to claim 9, wherein:

the decomposition process comprises a singlular value decomposition or other types of matrix decomposition methods.

15. The apparatus according to claim 9, wherein:

the reconstruction process corresponding to the second set of mass spectra is performed in one of a location-by-location fashion or jointly for all the second group of spatial positions simultaneously.

16. The apparatus according to claim 9, wherein:

the FT MS image comprises at least one of the following:
  a Fourier transform ion cyclotron resonance (FT-ICR) mass spectrometry image; or
  a Fourier transform Orbitrap mass spectrometry image.

17. A non-transitory computer readable storage medium storing computer readable instructions, wherein, the computer readable instructions, when executed by a processor, are configured to cause the processor to perform:

conducting a data collection process that generates non-uniform lengths of FT-MS data across different spatial locations on a sample, the FT-MS data comprising a first set of image data corresponding to a first group of spatial positions on the sample and a second set of image data corresponding to a second group of spatial positions on the sample;

conducting a decomposition process on the first set of image data to obtain a set of basis elements for the sample;

performing a reconstruction process on a second set of image data based on the set of basis elements to obtain a set of reconstructed image data;

performing a first Fourier transform on the first set of image data to obtain a first set of mass spectra, the first set of mass spectra corresponding to the first group of spatial positions on the sample;

performing a second Fourier transform on the set of reconstructed image data to obtain a second set of mass spectra, the second set of mass spectra corresponding to the second group of spatial positions on the sample; and obtaining a FT-MS image for the sample based on the first set of mass spectra and the second set of mass spectra.

18. The non-transitory computer readable storage medium according to claim 17, wherein:

the first set of image data corresponds to data with a first transient duration;

the second set of image data corresponds to data with a second transient duration; and the second transient duration is shorter than the first transient duration.

19. The non-transitory computer readable storage medium according to claim 17, wherein:

the first set of image data corresponds to a FT MS image with a first mass resolution;

the second set of image data corresponds to a FT MS image with a second mass resolution; and the first mass resolution is finer than the second mass resolution.

20. The non-transitory computer readable storage medium according to claim 17, wherein:

the first group of spatial positions comprises a first number of spatial positions;

the second group of spatial positions comprises a second number of spatial positions; and the first number is smaller than the second number.

* * * * *

UNITED STATES PATENT AND TRADEMARK OFFICE
CERTIFICATE OF CORRECTION

| | | |
|---|---|---|
| PATENT NO. | : 12,308,222 B2 | Page 1 of 1 |
| APPLICATION NO. | : 17/705979 | |
| DATED | : May 20, 2025 | |
| INVENTOR(S) | : Fan Lam et al. | |

It is certified that error appears in the above-identified patent and that said Letters Patent is hereby corrected as shown below:

In the Specification

In Column 16, Line 26, delete first instance of "a" and replace with --α--.

Signed and Sealed this
Twenty-fourth Day of June, 2025

Coke Morgan Stewart
*Acting Director of the United States Patent and Trademark Office*